United States Patent [19]

Padovani et al.

[11] 4,213,937
[45] Jul. 22, 1980

[54] SILICON REFINERY

[75] Inventors: Francois A. Padovani, Dallas; Michael B. Miller, Richardson; James A. Moore, Dallas; James H. Fowler; Malcom N. June, both of, Plano, all of Tex.; James D. Matthews; T. R. Morton; Norbert A. Stotko; Lewis B. Palmer, all of Denver, Colo.

[73] Assignee: Texas Instruments Incorporated, Dallas, Tex.

[21] Appl. No.: 726,018

[22] Filed: Sep. 22, 1976

Related U.S. Application Data

[62] Division of Ser. No. 494,005, Jul. 31, 1974, Pat. No. 4,092,446.

[51] Int. Cl.$^2$ .................... B01J 8/18; C01B 33/00
[52] U.S. Cl. ................... 422/142; 422/147; 422/189; 422/234; 423/348
[58] Field of Search ............ 23/260, 263, 277 R; 423/349, 350, 348, 342; 422/140, 142, 147, 189, 234

[56] References Cited

U.S. PATENT DOCUMENTS

| | | | |
|---|---|---|---|
| 3,020,128 | 2/1962 | Adcock et al. | 423/350 |
| 3,091,517 | 5/1963 | Short et al. | 423/342 |
| 3,745,043 | 7/1973 | Bradley | 423/350 |

*Primary Examiner*—Michael S. Marcus
*Attorney, Agent, or Firm*—Gary C. Honeycutt; Richard L. Donaldson; James T. Comfort

[57] ABSTRACT

A balanced, closed cycle silicon refinery system has been developed for producing electronic grade silicon from industrial grade silicon. Impurities comprising approximately 1% of the industrial grade silicon are removed in the refinery system to produce the purified silicon, while only a relatively small percentage of make-up chemicals are added to the system. In the refinery, hydrogen chloride is reacted with the impure silicon in a halide reactor to provide trichlorosilane and silicon tetrachloride and hydrogen. The trichlorosilane and/or silicon tetrachloride are passed through purification means, and then reacted with the hydrogen from the halide reactor in a fluidized bed reactor to produce the purified silicon and an effluent comprised of unreacted trichlorosilane, silicon tetrachloride, hydrogen, and the by-product hydrogen chloride. These materials are passed through a separator and the trichlorosilane and silicon tetrachloride and hydrogen are returned to the silicon reactor while the hydrogen chloride is returned to the halide reactor to be reacted with additional industrial grade silicon.

28 Claims, 26 Drawing Figures

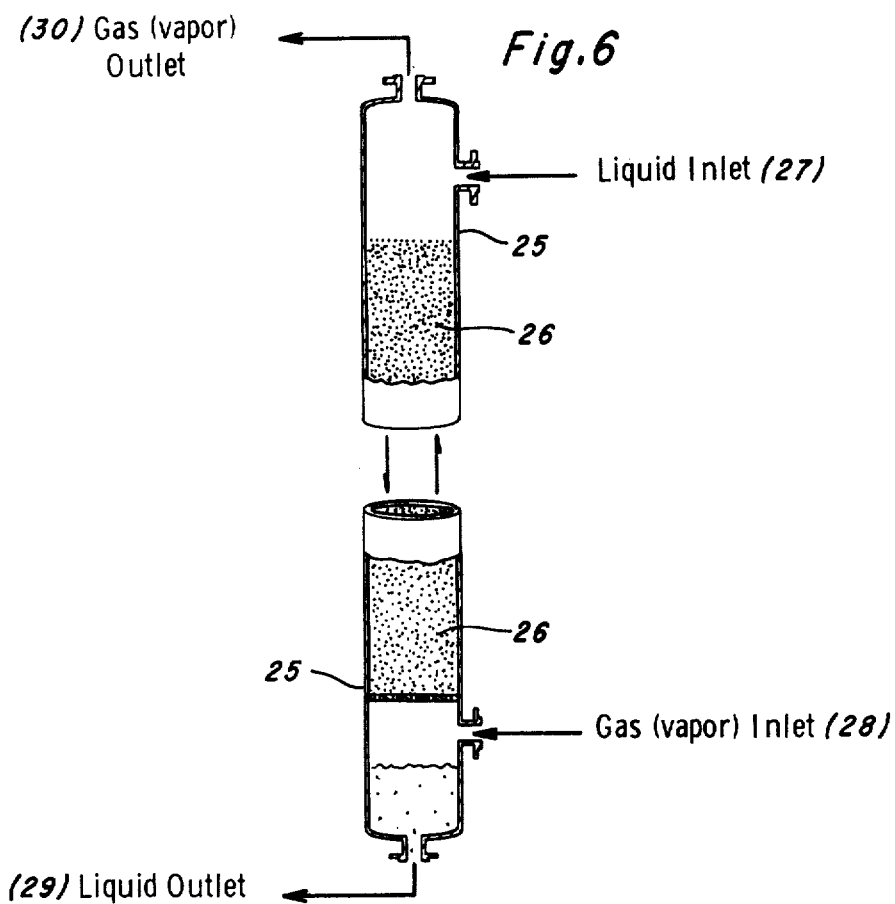
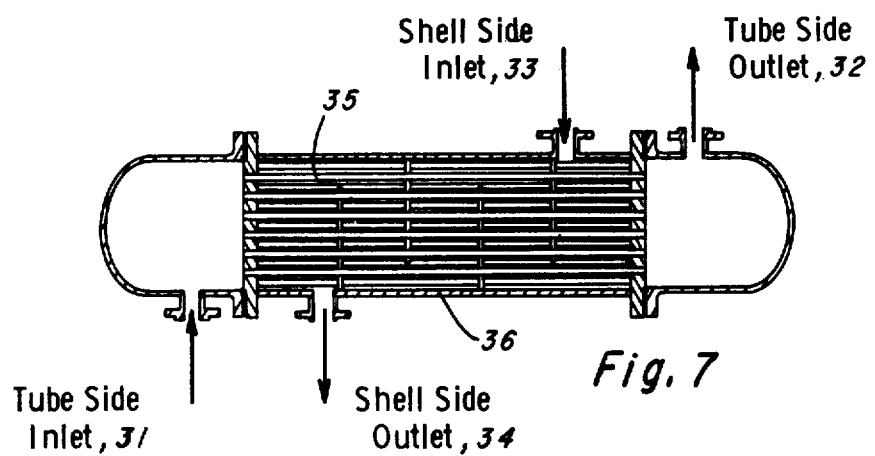

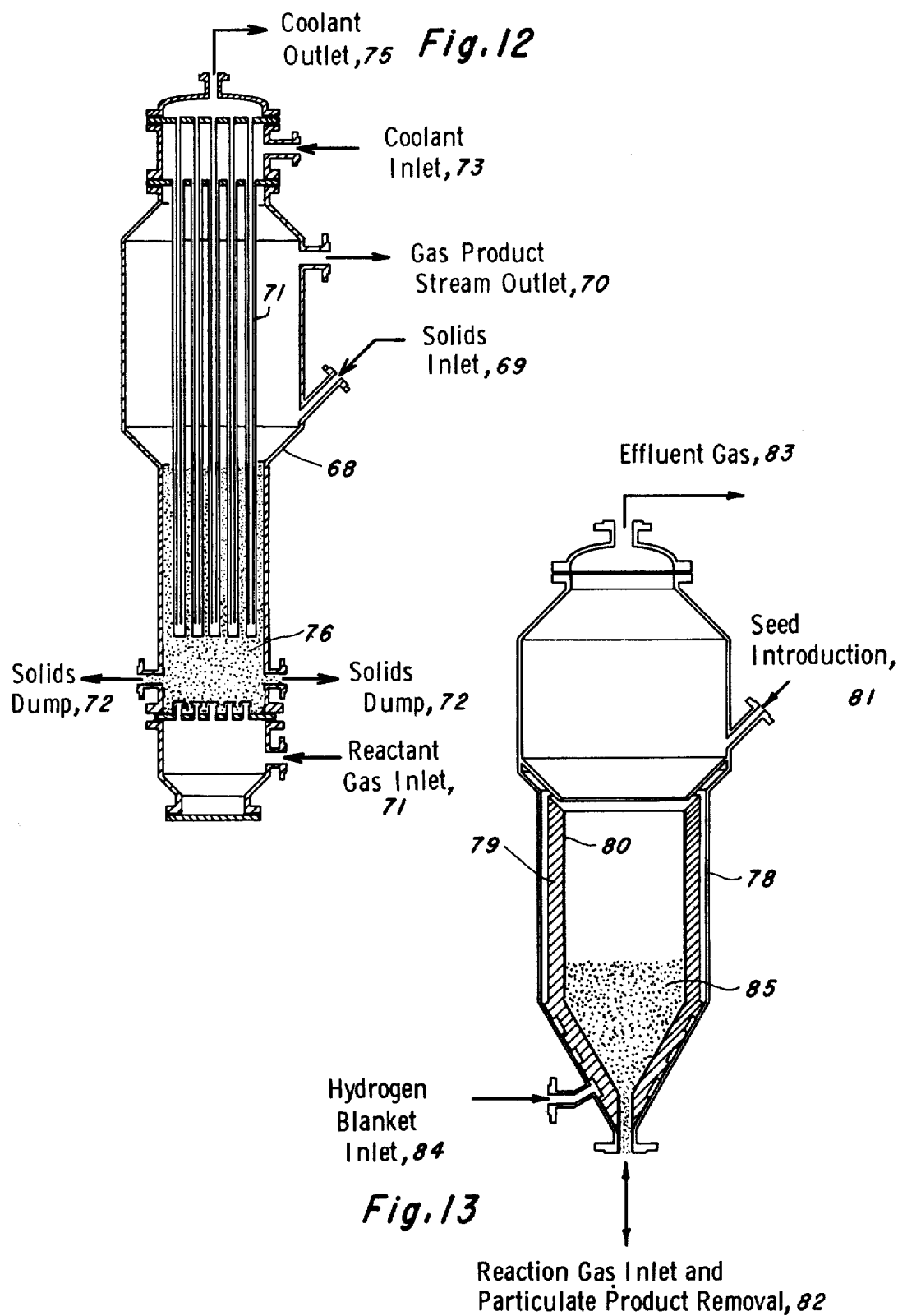

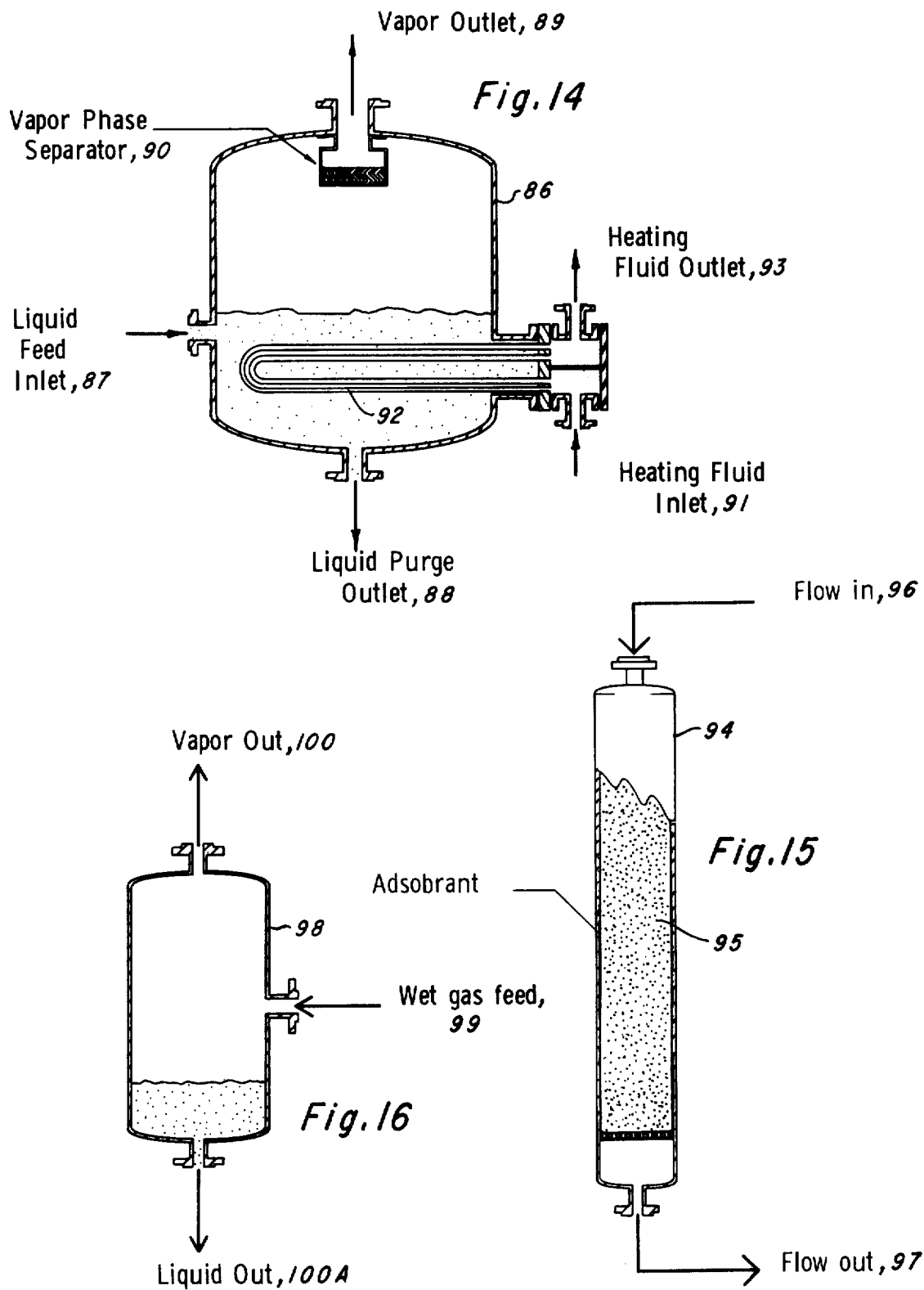

SILICON REFINERY

This is a division of application Ser. No. 494,005, filed July 31, 1974, now U.S. Pat. No. 4,092,446.

This invention relates to a refinery for the production of purified electronic grade silicon material, and more particularly to a closed cycle refinery for the production of electronic grade silicon from industrial grade silicon.

Industrial grade silicon containing about 1% impurities is usually produced from a silica-comprising material, such as sand. In order to use this industrial grade silicon for electronic devices, the silicon must be further refined to contain impurities of less than one part per billion. In order to accomplish this, the semiconductor electronic industry has utilized batch processing centered around the "filament type" chemical vapor deposition reactors. In it, the reactive gases are contacted with a resistively-heated starting rod which grows in diameter as deposition of silicon occurs. A separate plant is utilized to produce and purify the trichlorosilane (TCS) and/or silicon tetrachloride (TET) from industrial grade silicon and hydrochloric acid. The hydrogen chloride is usually produced in still another plant and purchased separately. After the purified TCS and/or TET is produced in the "halide plant" it is transported to the batch "silicon plant" to be reacted in the filament type vapor deposition reactors to produce silicon and an effluent stream. The effluent stream is sometimes discarded. At other times, some of the unreacted TCS and TET are removed from the effluent stream in a separate "recovery plant" and the remaining chemicals discarded. This requires the continuous addition of large quantities of hydrogen chloride and hydrogen to the system and the waste to the process of a large quantity of silicon material, usually in the form of the TCS and/or TET.

It is therefore an object of the present invention to provide an improved method and system for the production of electronic grade silicon.

It is another object of the invention to provide an integrated closed cycle silicon production plant for the purification of industrial grade silicon to electronic grade silicon without the addition of large quantities of chemicals other than silicon.

Still another object of the invention is to provide such an integrated closed cycle silicon refinery which minimizes the loss of silicon material.

The accomplishment of these objectives is particularly important at the present time when the world is experiencing a shortage of silicon material and an overabundance of chemical waste products.

These and other objects are accomplished in accordance with the present invention by a balanced, integrated, closed-cycle silicon refinery. The closed-cycle refinery is balanced in such a manner that impure industrial grade silicon along with a minimal amount of "makeup" chemicals are put into one end of the refinery and electronic grade silicon containing less than one part per billion impurity and the impurities are separately removed at the other end of the refinery. Hydrogen and chlorine are continuously cycled back and forth through the refinery so that only a small percentage of these constituents are expended requiring the addition of some minimal amount of "makeup" chemicals.

The process of the refinery in accordance with an embodiment of the present invention may be described in the following. The impure industrial grade silicon is reacted with hydrogen chloride in a halide reactor to produce TCS ($HSiCl_3$) and/or TET ($SiCl_4$) and hydrogen ($H_2$). The TCS and/or TET are purified to remove the impurities by fractionation and vaporization. The portion of the TCS and/or TET containing the impurities are further fractionated to remove the impurities and return most of the TCS and TET back to the halide reactor while the purified TCS and TET are reacted with the hydrogen produced by the halide reactor in a fluidized bed reactor. The fluidized bed reactor has many advantages over the chemical vapor deposition filament type reactor process including that of economy. In the refinery of the present invention, the fluidized bed reactor provides the continuous balance between the production of the TCS and/or TET in the halide reactor and the reduction of silicon halides to produce silicon in the fluidized bed reactor.

In accordance with the fluidized bed reactor process for the preparation of semiconductor grade silicon, a mixture of the TCS and TET is fed to the reactor along with the hydrogen produced in the halide reactor to fluidize a bed of growing silicon seed particles which are continuously or semicontinuously added and withdrawn. Continuity of operation, the use of relatively high concentrations of the TCS and/or TET in the reactant stream with hydrogen, and the efficiency of exposure of the surface of the seed particles to the reactant gas stream are some of the major factors in the abovementioned economy of the fluidized bed reactor in the refinery system of the invention. Hydrogen chloride is absorbed from the effluent of the fluidized bed reactor and is cycled back to the halide reactor. Unreacted hydrogen is returned to the fluidized bed reactor, and unreacted TCS and/or TET is returned to the impure TCS and TET stream coming from the halide reactor to be repurified and vaporized and returned to the fluidized bed reactor.

It can thus be seen that once the refinery is initially charged with hydrogen chloride and hydrogen, the hydrogen and chlorine are reacted, reconstituted, and recycled repeatedly in a closed cycle requiring only a relatively small amount of "make-up" chemicals, while large quantities of impure silicon are charged through the refinery to produce almost equally large quantities of refined electronic grade silicon material. In addition, almost 100% of the silicon material in the system becomes pure silicon and only a small proportion of the silicon material is dumped as is done in the present batch plant processing as described above.

Still further objects and advantages of the present invention will be realized from the detailed description and claims and from the drawings wherein:

Figure 4:
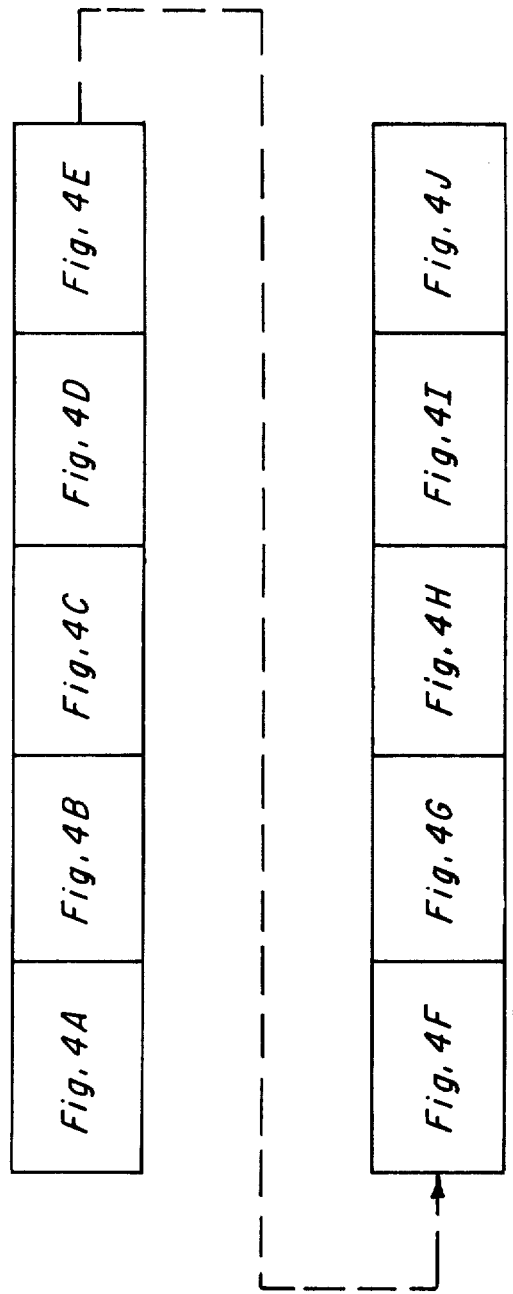
Figure 5:
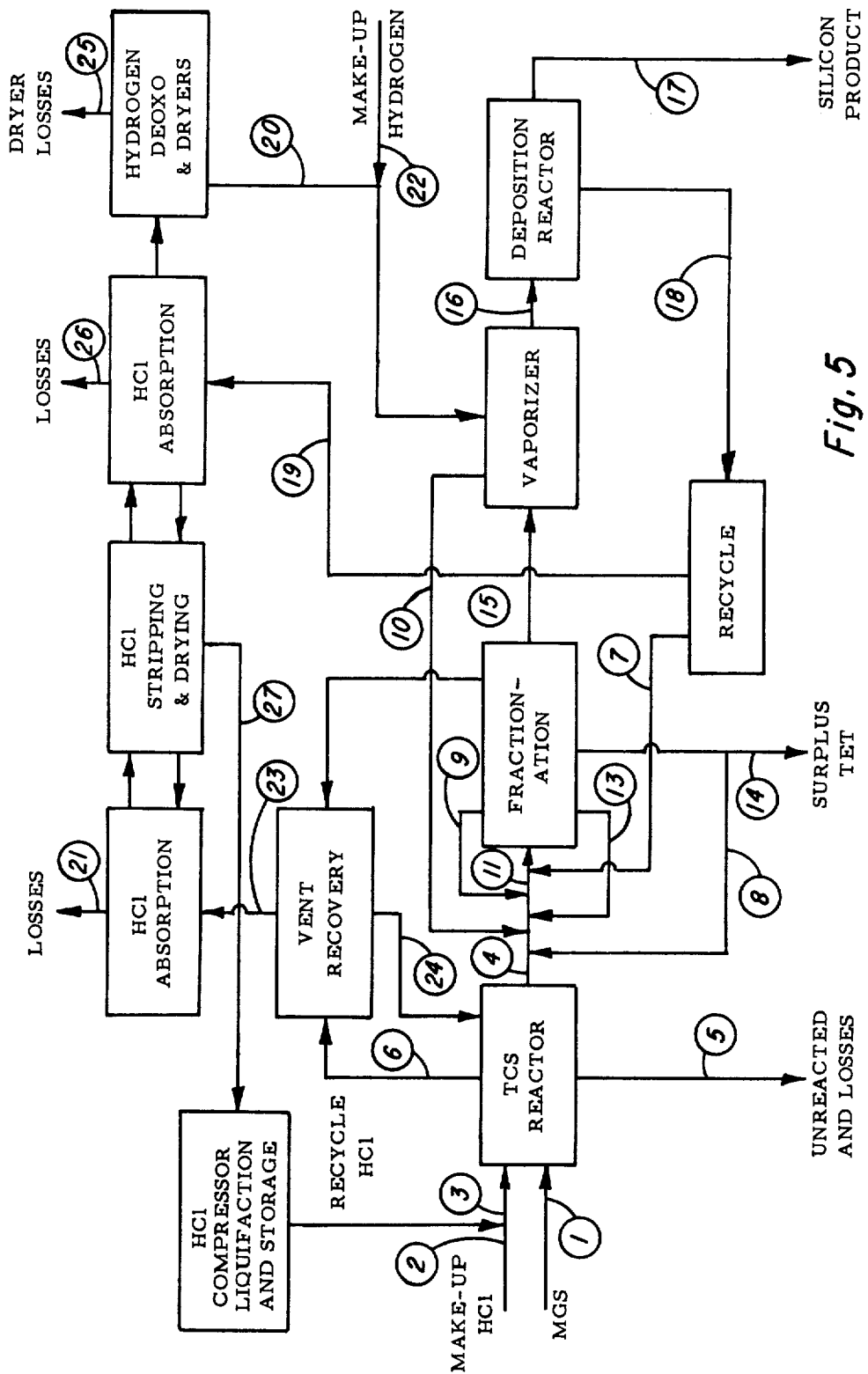
Figure 8:
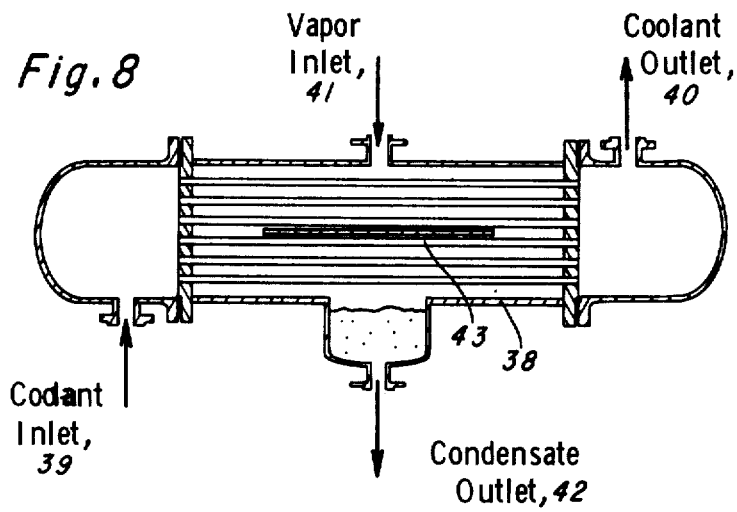
Figure 9:
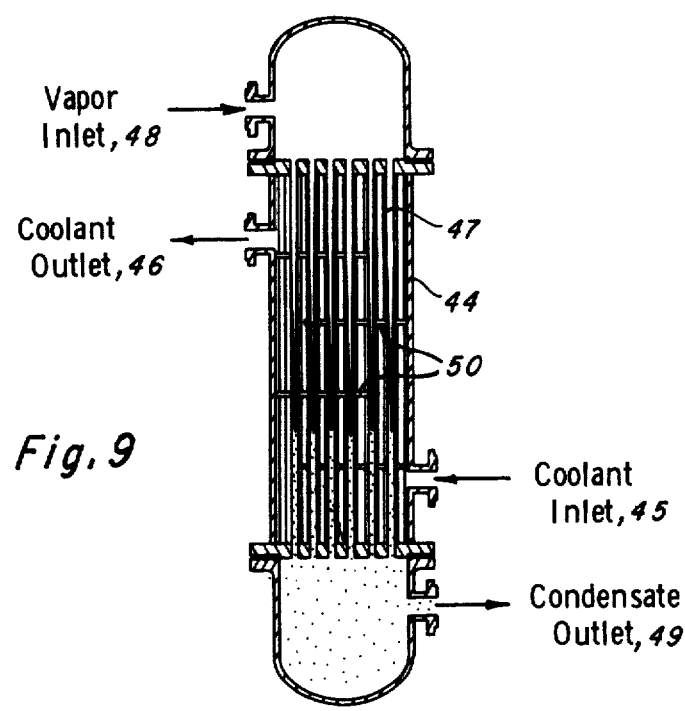
Figure 10:
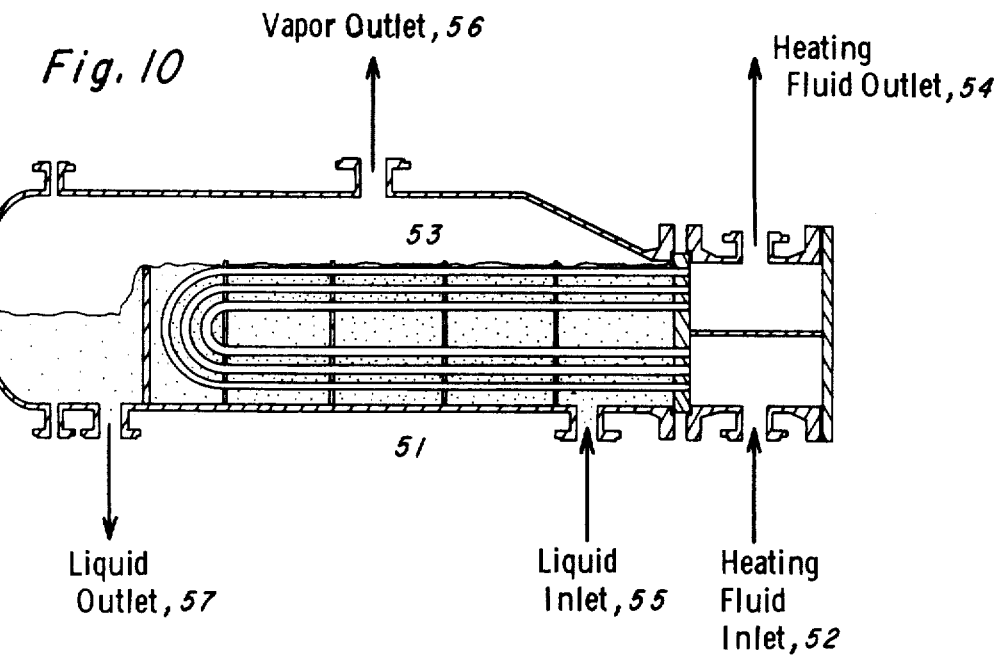
Figure 11:
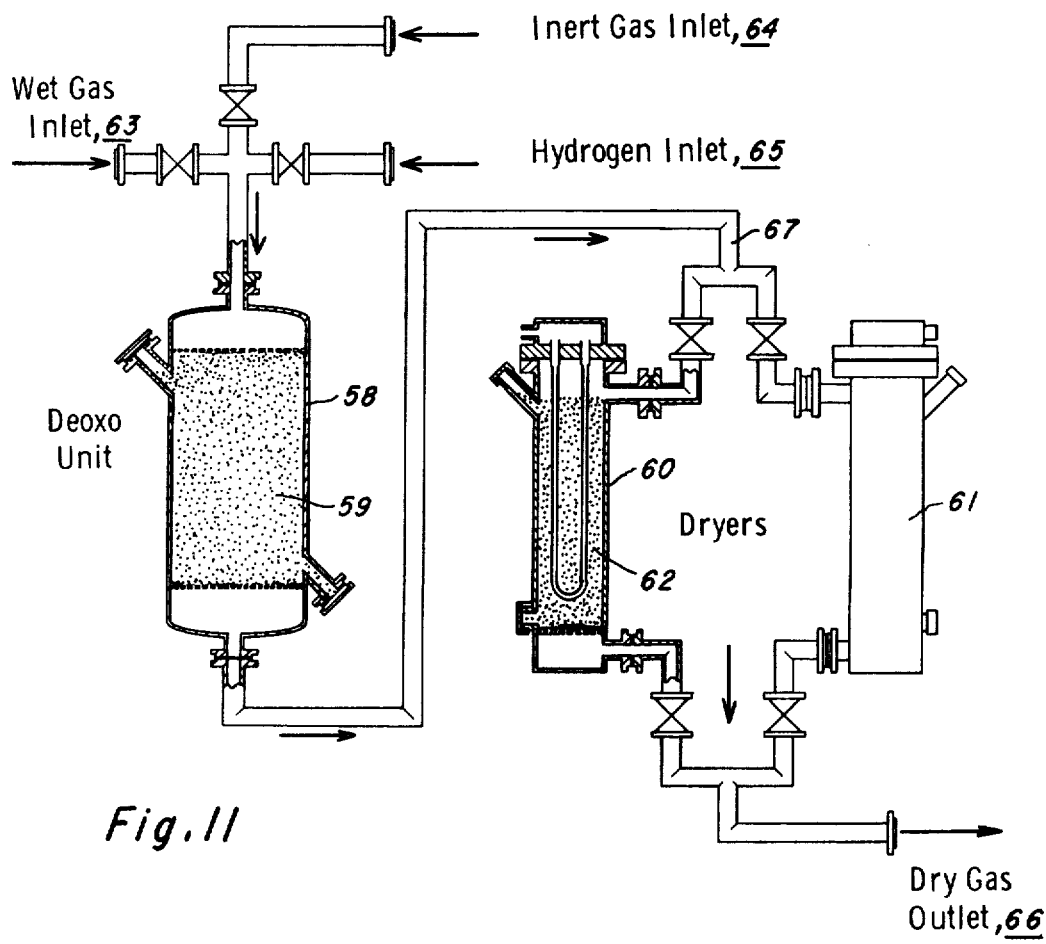

FIG. 4 including FIGS. 4A-J, is a systems diagram showing the interconnection of various apparatus to provide an embodiment of the silicon refinery according to the present invention;

FIG. 5 is a block diagram showing material flow through the system of FIG. 4 when read in conjunction with TABLE I;

FIGS. 6–16 are detailed drawings of the various apparatus utilized in the embodiment of FIG. 4 wherein;

FIG. 6 is a cross-sectional view of a packed bed column;

FIG. 7 is a cross-sectional view of a shell and tube heat exchanger;

FIG. 8 is a cross-sectional view of a process fluid condenser;

FIG. 9 is a cross-sectional view of another type of process fluid condenser;

FIG. 10 is a cross-sectional view of a kettle reboiler;

FIG. 11 is a cross-sectional view of the deoxo unit and dryers;

FIG. 12 is a cross-sectional view of the halosilane fluid bed type reactor;

FIG. 13 is a cross-sectional view of the silicon fluid bed deposition reactor;

FIG. 14 is a cross-sectional view of a process fluid boiler;

FIG. 15 is a cross-sectional view of a packed bed adsorber; and

FIG. 16 is a cross-sectional view of a knockout drum.

Figure 1:
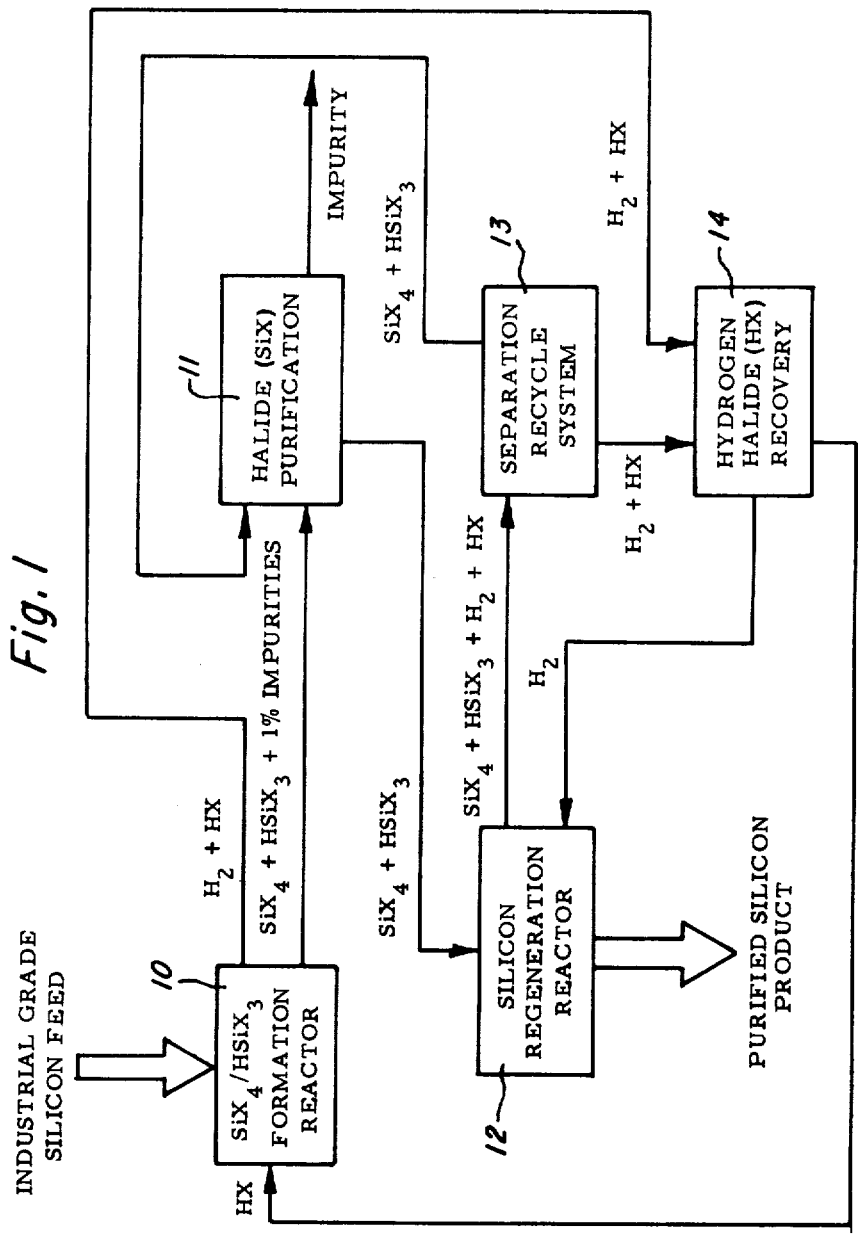
FIG. 1 is a block diagram of a balanced closed cycle reaction in the silicon refinery according to an embodiment of the present invention.

Referring now to FIG. 1, the balanced closed cycle silicon refinery process embodied in the present invention is illustrated in a general manner. In this process, industrial grade silicon having an impurity level of approximately 1% is reacted in zone 10 with a hydrogen halide (HX) to form a silicon halide and/or halosilane. In the embodiment described in further detail in this specification, the reactor is of the fluidized bed type in which silicon halide ($SiX_4$) and/or one or more halosilanes (mainly the trihalosilane $HSiX_3$) is produced along with a separate effluent stream containing in gaseous form the reaction product hydrogen ($H_2$) and unreacted hydrogen halide (HX). A portion of the 1% impurities from the industrial grade silicon feed is carried with the silicon halide and/or halosilanes. In the next step of the process, zone 11, those impurities are removed from the silicon halide and/or halosilanes. Meanwhile, the effluent stream from the halide reactor is separated from the unreacted hydrogen halide in the recovery step, zone 14. In zone 12, the purified silicon halide and/or halosilanes from zone 11 are reacted in a silicon regeneration reactor, preferably of the fluidized bed type, with the separated hydrogen from zone 14 to produce the purified silicon product. The effluent stream from the silicon regeneration reactor contains unreacted silicon halide and/or halosilanes, unreacted hydrogen and the by-product hydrogen halide. In zone 13, the silicon halide and/or halosilanes are separated from the hydrogen and hydrogen halide. The silicon halide and/or halosilane from the separation are partially repurified in zone 11 and then returned to the silicon regeneration reactor, zone 12. The separated hydrogen and hydrogen halide are added to the hydrogen and hydrogen halide carried in the effluent stream from the silicon halide formation, block 10, to the separation step of zone 14 where the hydrogen is separated from the hydrogen halide, the hydrogen being reutilized in the silicon regeneration reactor zone 12 and the hydrogen halide being reutilized in the silicon halide formation reaction of zone 10.

Figure 2:
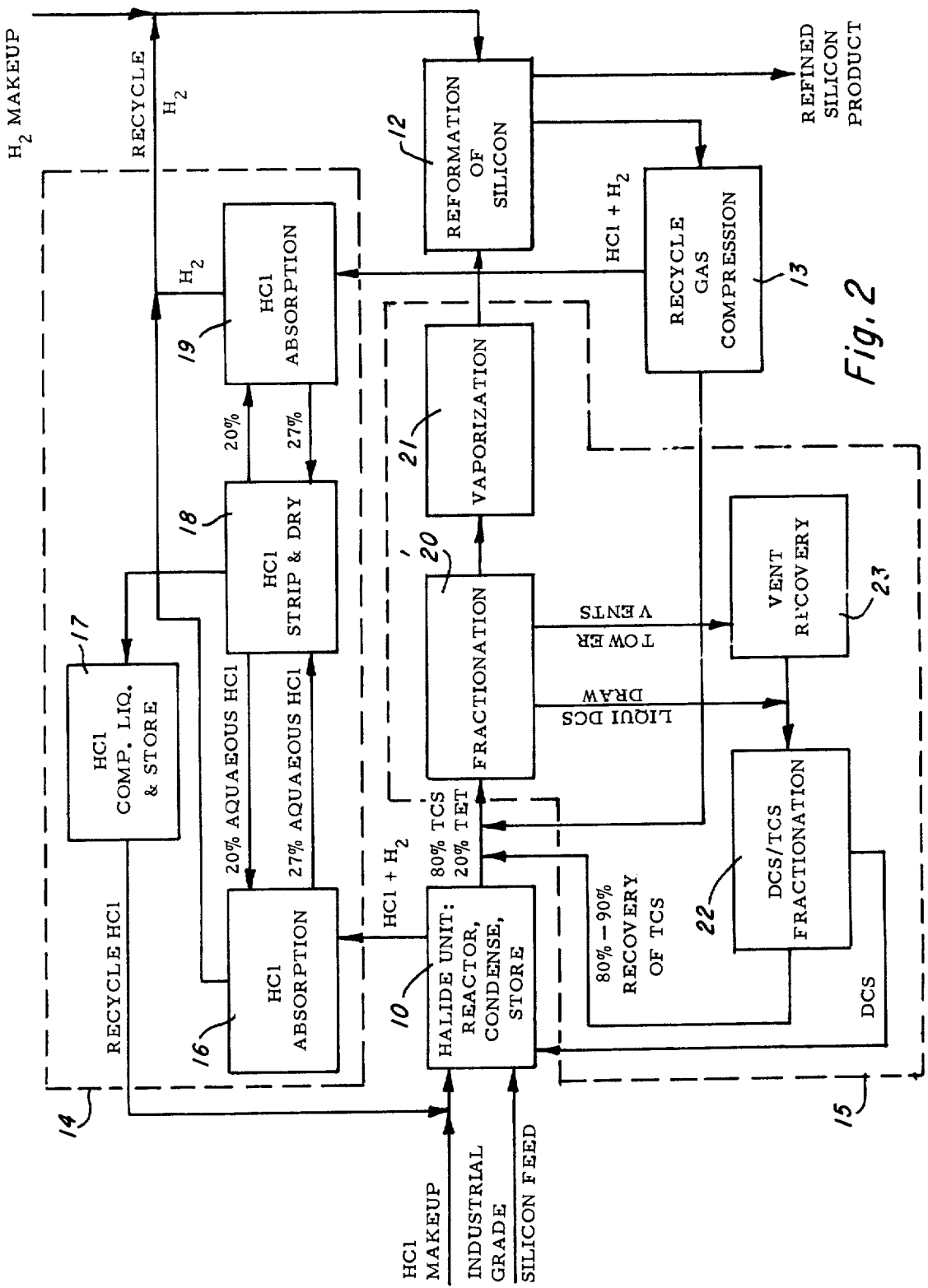
FIG. 2 is a more detailed block diagram of the process of FIG. 1.

In the halide reactions described above, the halogen may be selected from the group consisting of a fluoride, chloride, bromide or iodide and in a preferred embodiment of the invention, a chloride is utilized. A more detailed embodiment of the process of the silicon refinery is shown in FIG. 2 wherein the industrial grade silicon is reacted with hydrogen chloride in halide reactor unit 10 to produce silicon tetrachloride (TET) (approximately 20%) and trichlorosilane (TCS) (approximately 80%) and a separate gaseous effluent stream of unreacted hydrogen chloride and the by-product hydrogen. In a hydrogen chloride absorption bed, the hydrogen chloride is separated from the hydrogen. The hydrogen chloride is stripped and dried, zone 18, compressed, zone 17, and recycled to the halide reactor unit, zone 10. The hydrogen separated from the hydrogen chloride in zone 16 is recycled to the silicon reformation zone 12.

The TCS and TET product produced in the halide reactor unit contains a portion of the impurities of the industrial grade silicon feed not left behind in the halide reactor, which impurities are removed in the steps of zone 15. Zone 15 comprises a fractionation step, zone 20, and a vaporization step, zone 21, to remove the impurities from the TCS/TET stream. The purified TCS and TET are then reacted in a fluidized bed reactor, zone 12, with the separated hydrogen from zone 16 to produce the purified silicon product. In the fractionization step, zone 20, some of the TCS and TET are removed along with the impurities. An additional vent recovery step in zone 23 and DCS (dichlorosilane)/TCS fractionation step in zone 22 provides for the recovery of an additional 80–90% of the TCS from the impurities which is then repurified in the fractionation step of zone 20 and the DCS is returned to the halide reactor, zone 10.

Figure 3:
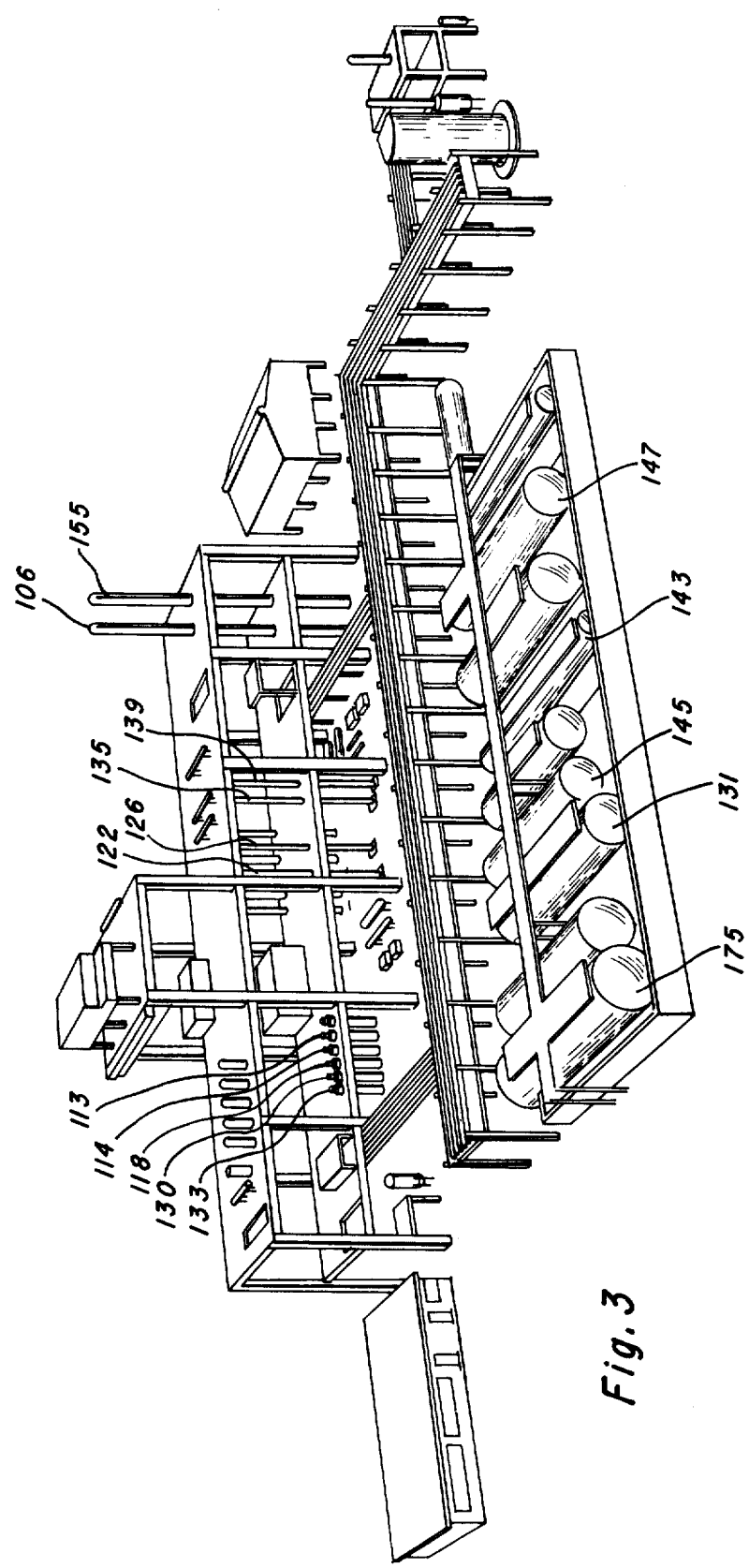
FIG. 3 is an isometric drawing showing the general physical placement of the various apparatus of the silicon refinery in accordance with an embodiment of the present invention.

A preferred embodiment of the invention is shown in FIGS. 3 and 4, including FIGS. 4A-J. The physical placement of the various apparatus comprising the preferred embodiment of the silicon refinery is shown in FIG. 3. It should be noted that, unlike the present silicon processing plants, the silicon reactor as well as the other portions of the refinery are not housed with an enclosure, thereby greatly reducing the capital required to build the silicon refinery in accordance with the invention. The most pertinent apparatus in FIG. 3 are numbered and correspond to the numbers in FIG. 4 which is henceforth described in detail.

The interconnection of the various apparatus of the preferred embodiment of the silicon refinery of the invention is shown in the system diagram of FIG. 4, including FIGS. 4A-J. FIG. 4 is a map showing the relationship of FIGS. 4A-J which, when placed together, show the interconnections between the various apparatus of the silicon refinery.

Figure 4A:
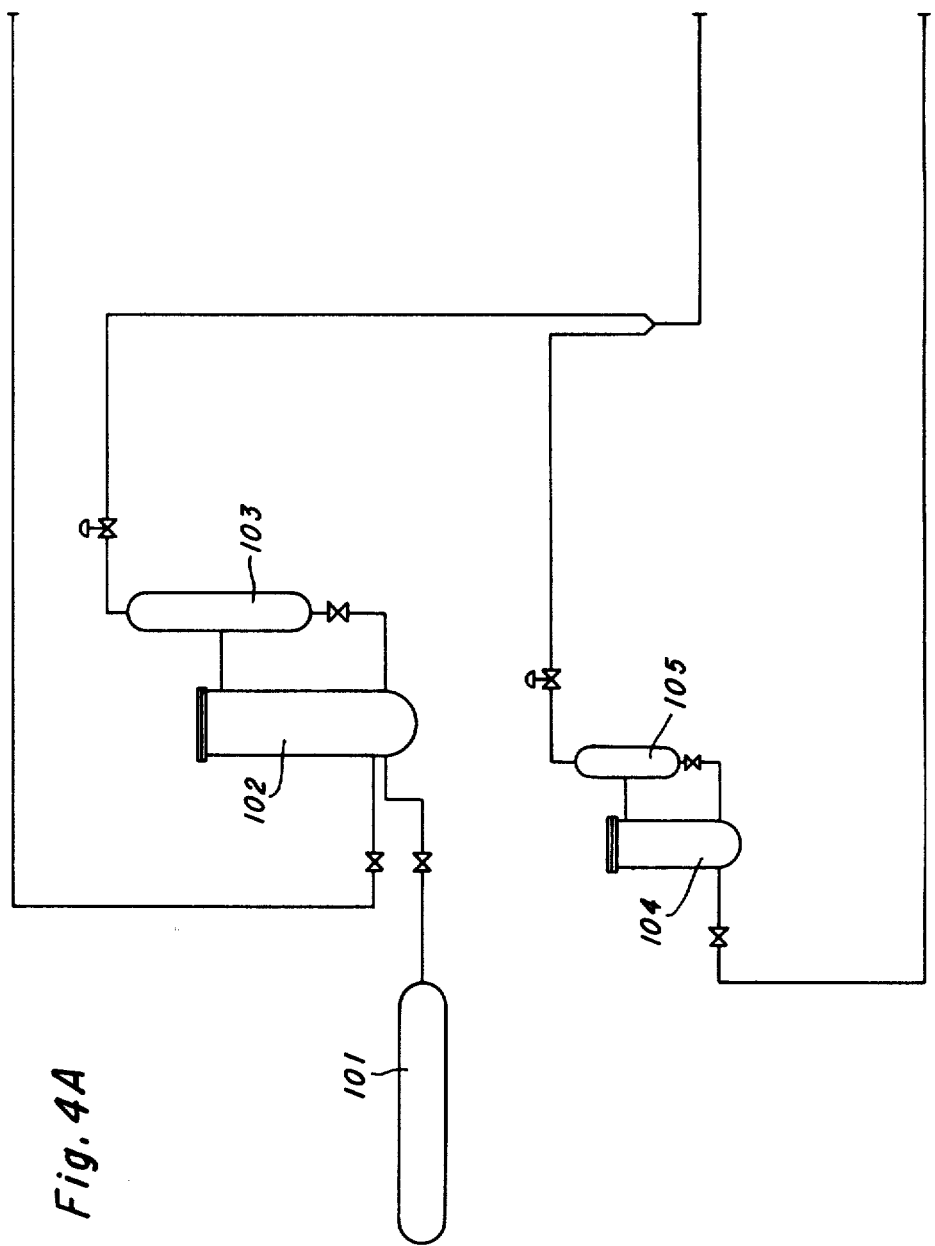
Figure 4B:
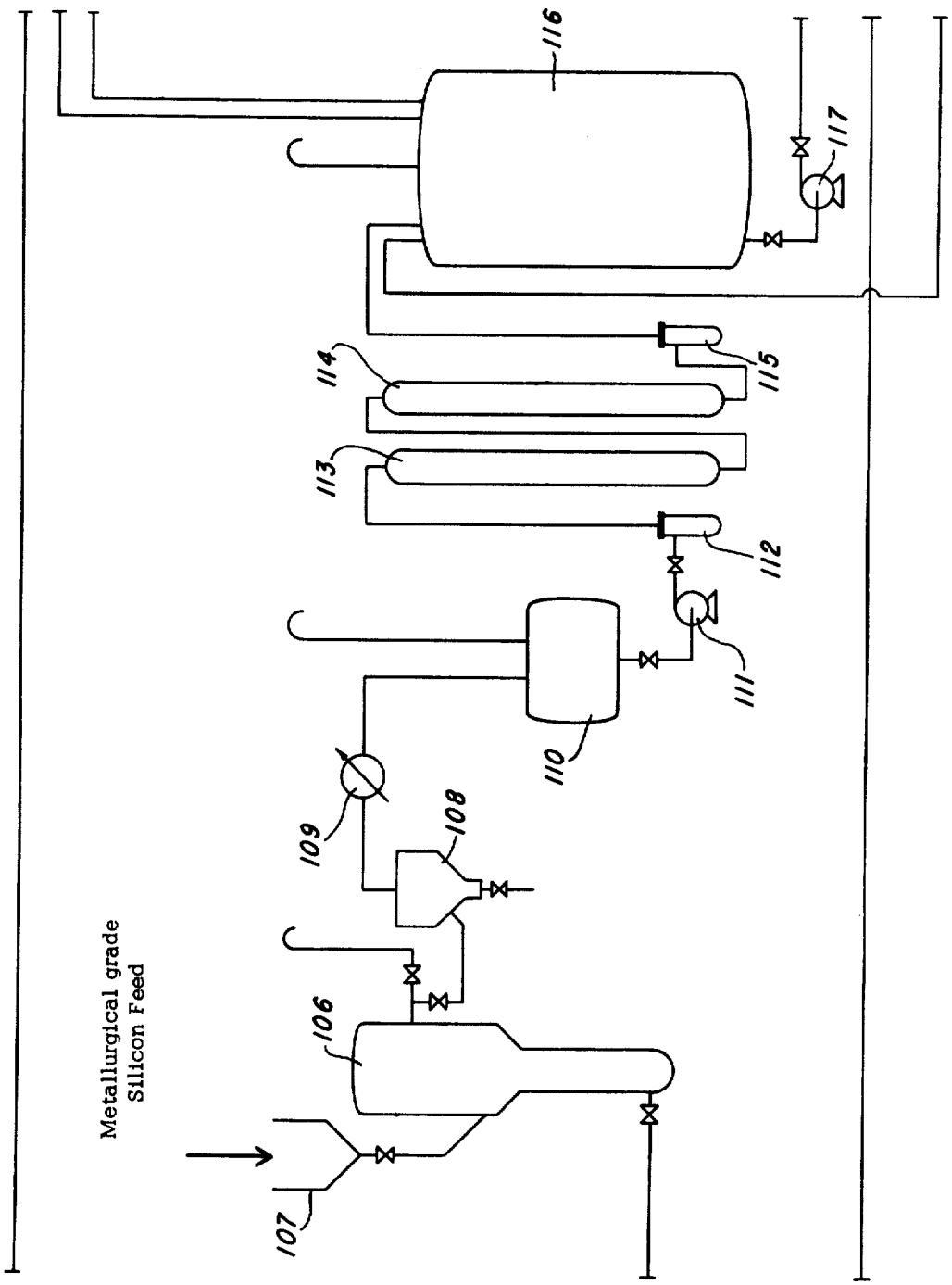
Figure 4C:
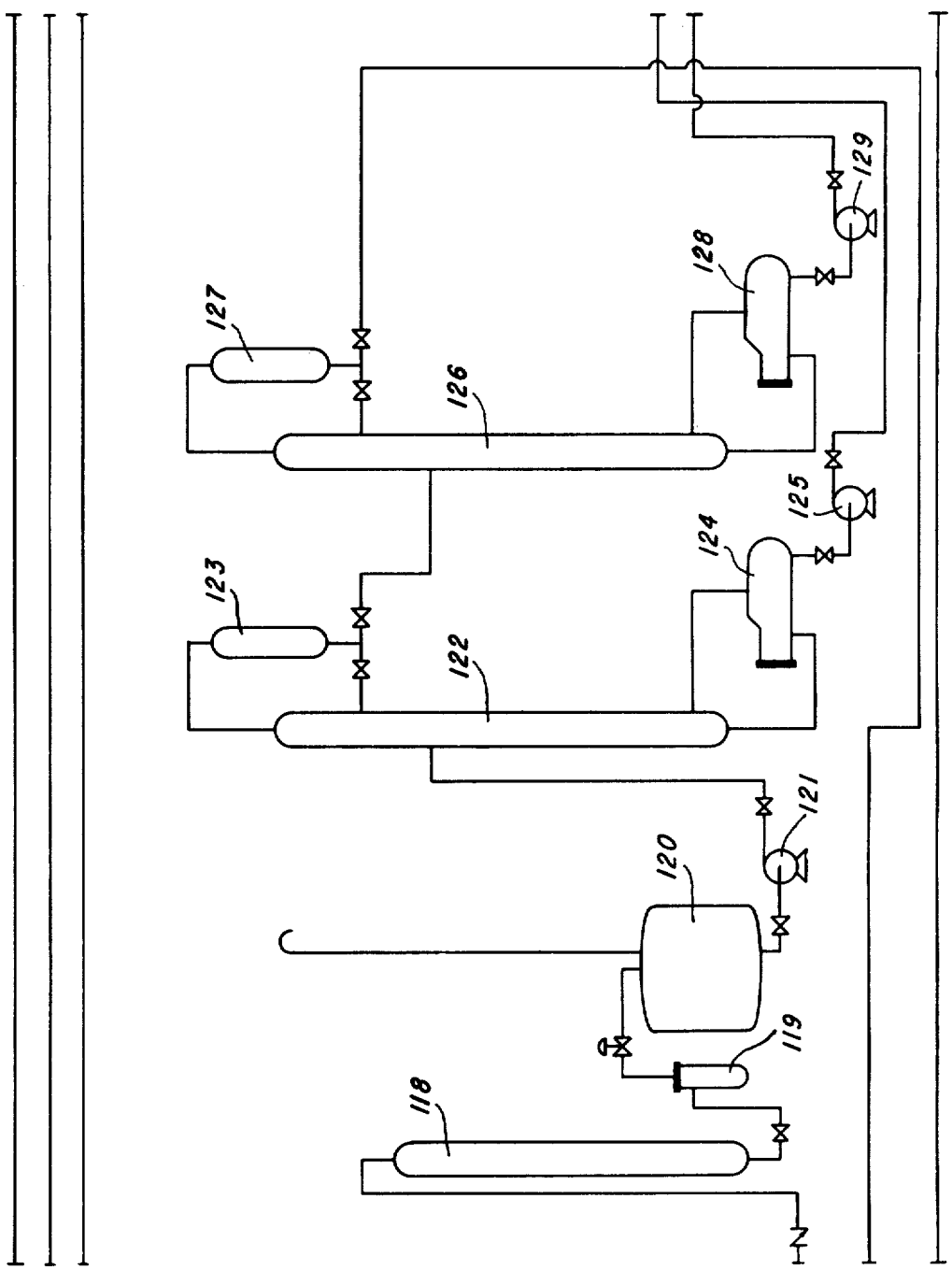
Figure 4D:
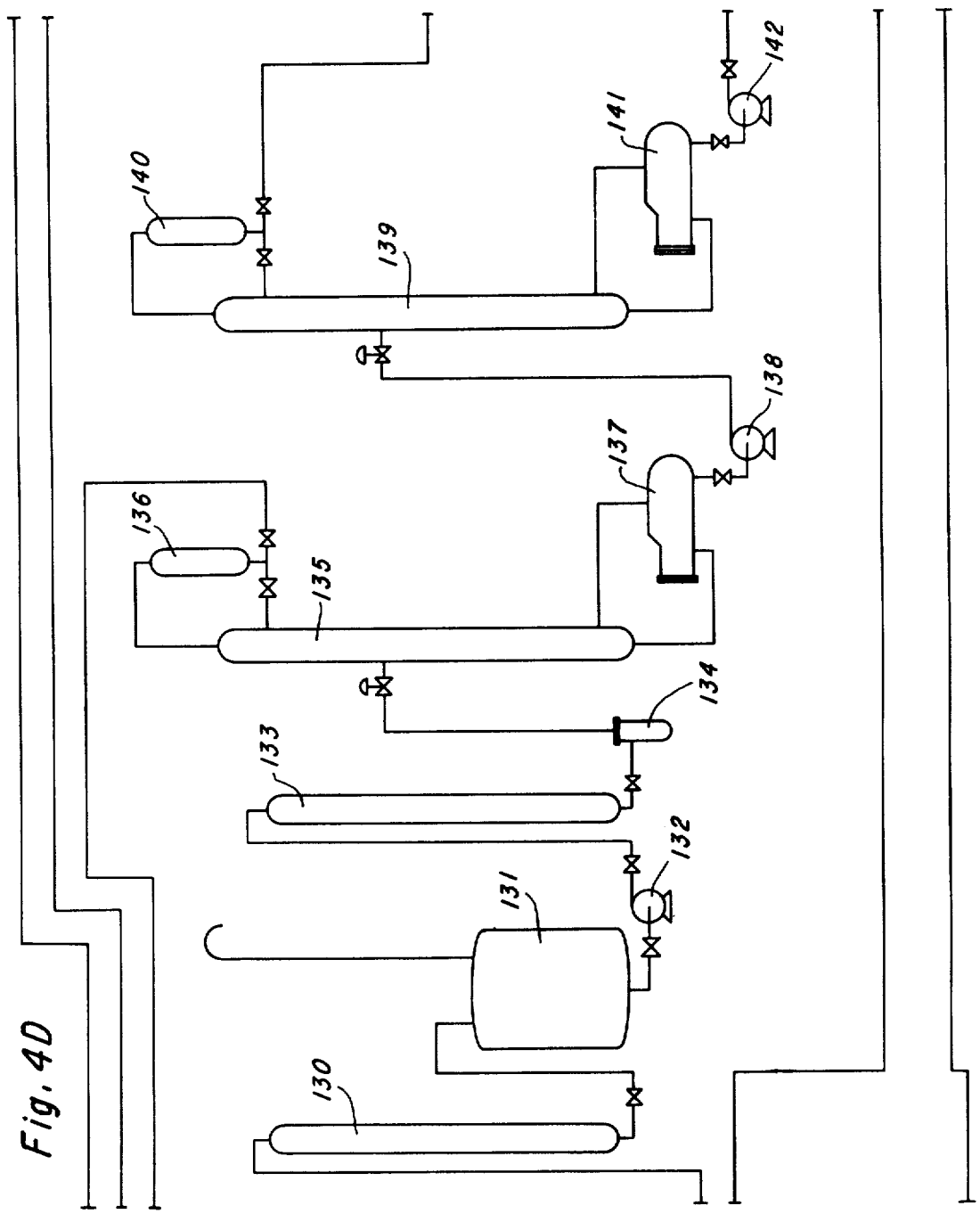
Figure 4E:
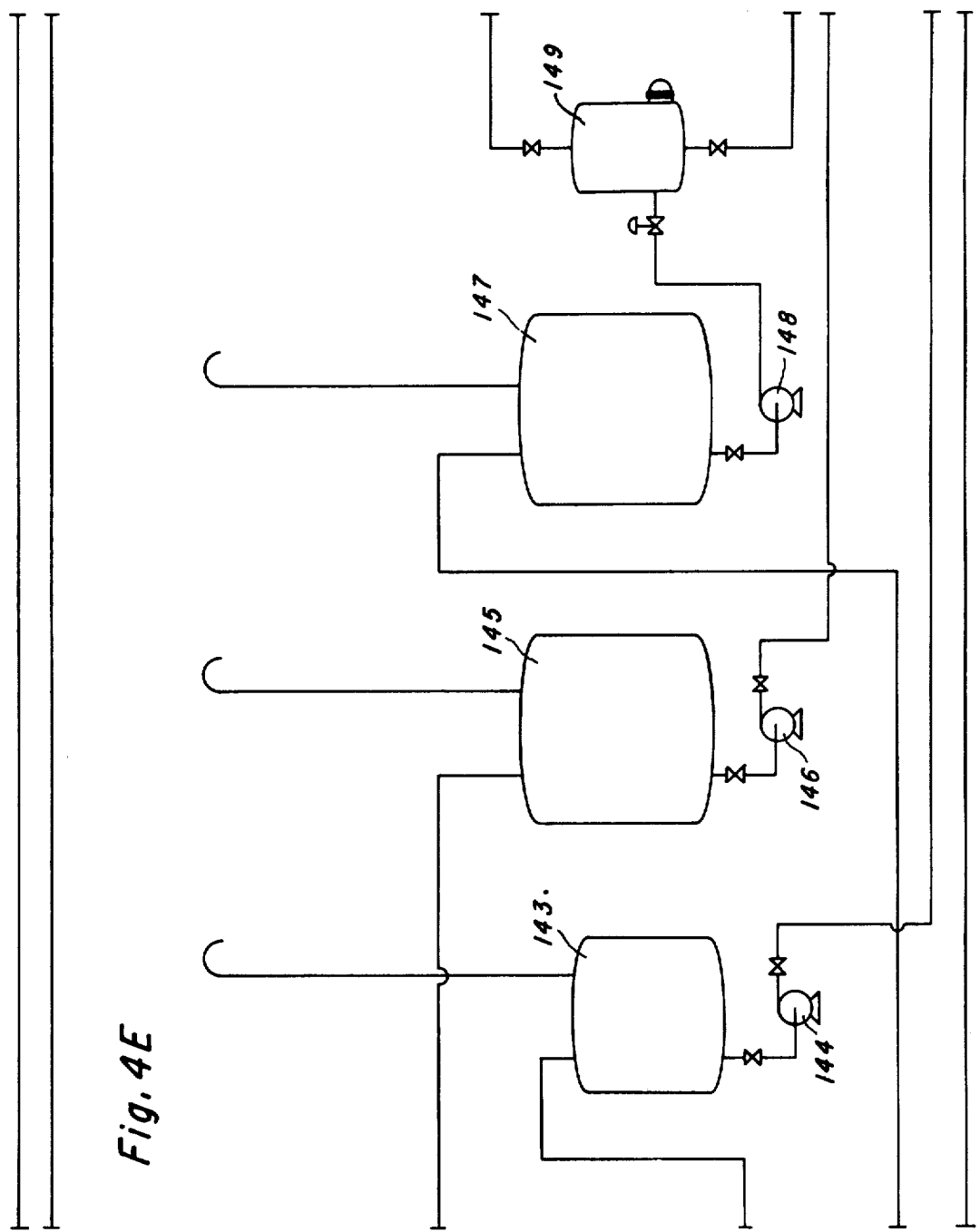
Figure 4F:
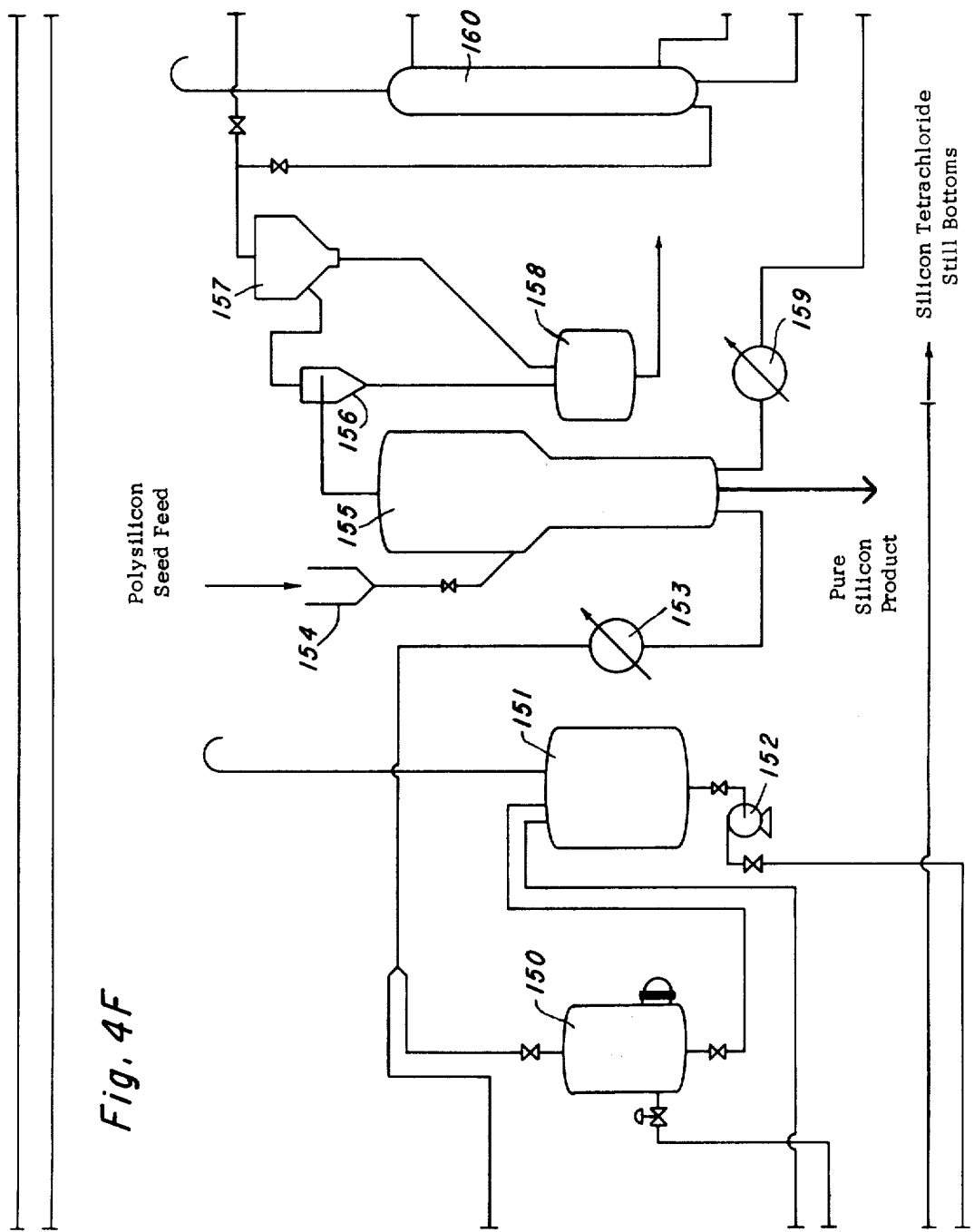
Figure 4G:
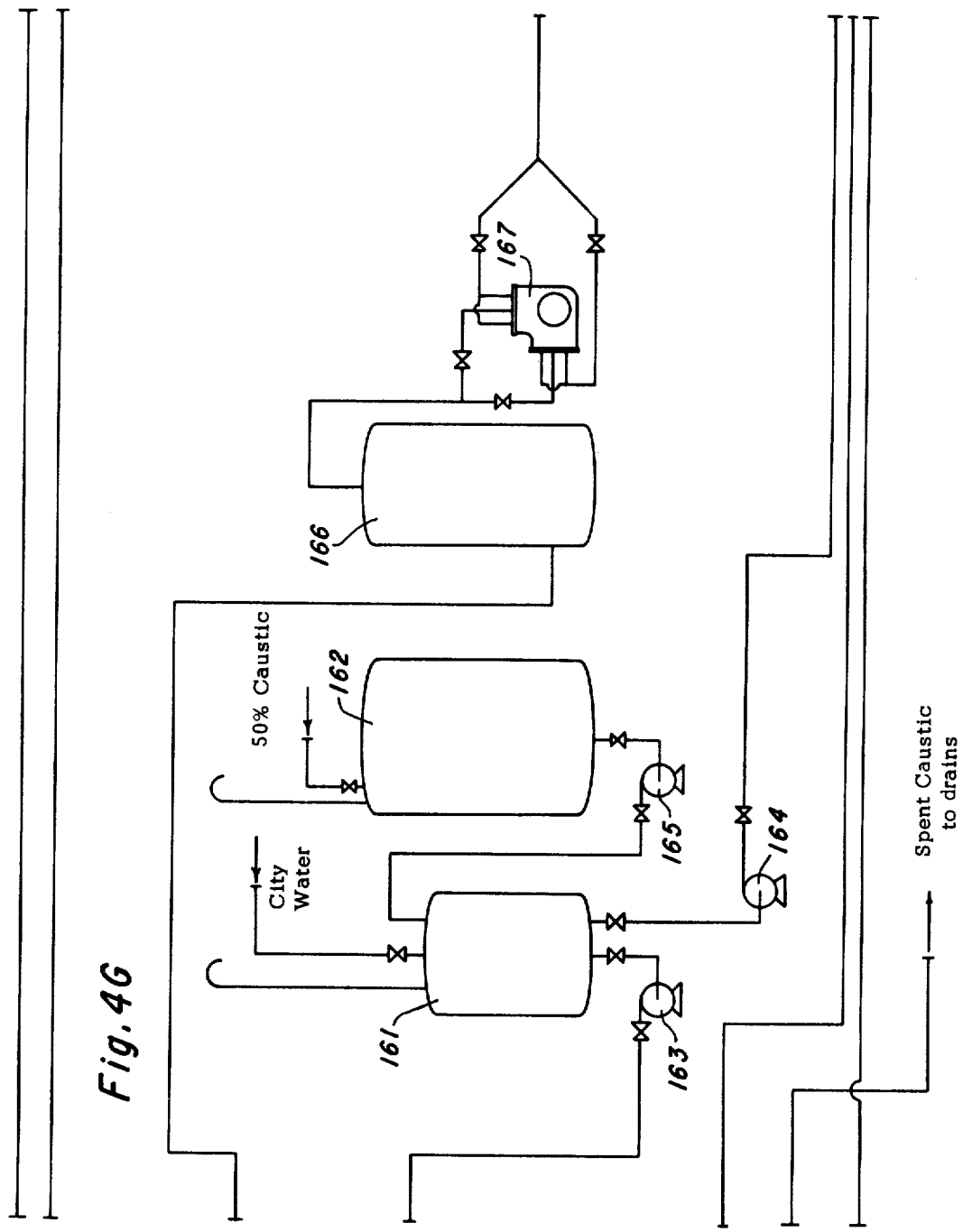
Figure 4H:
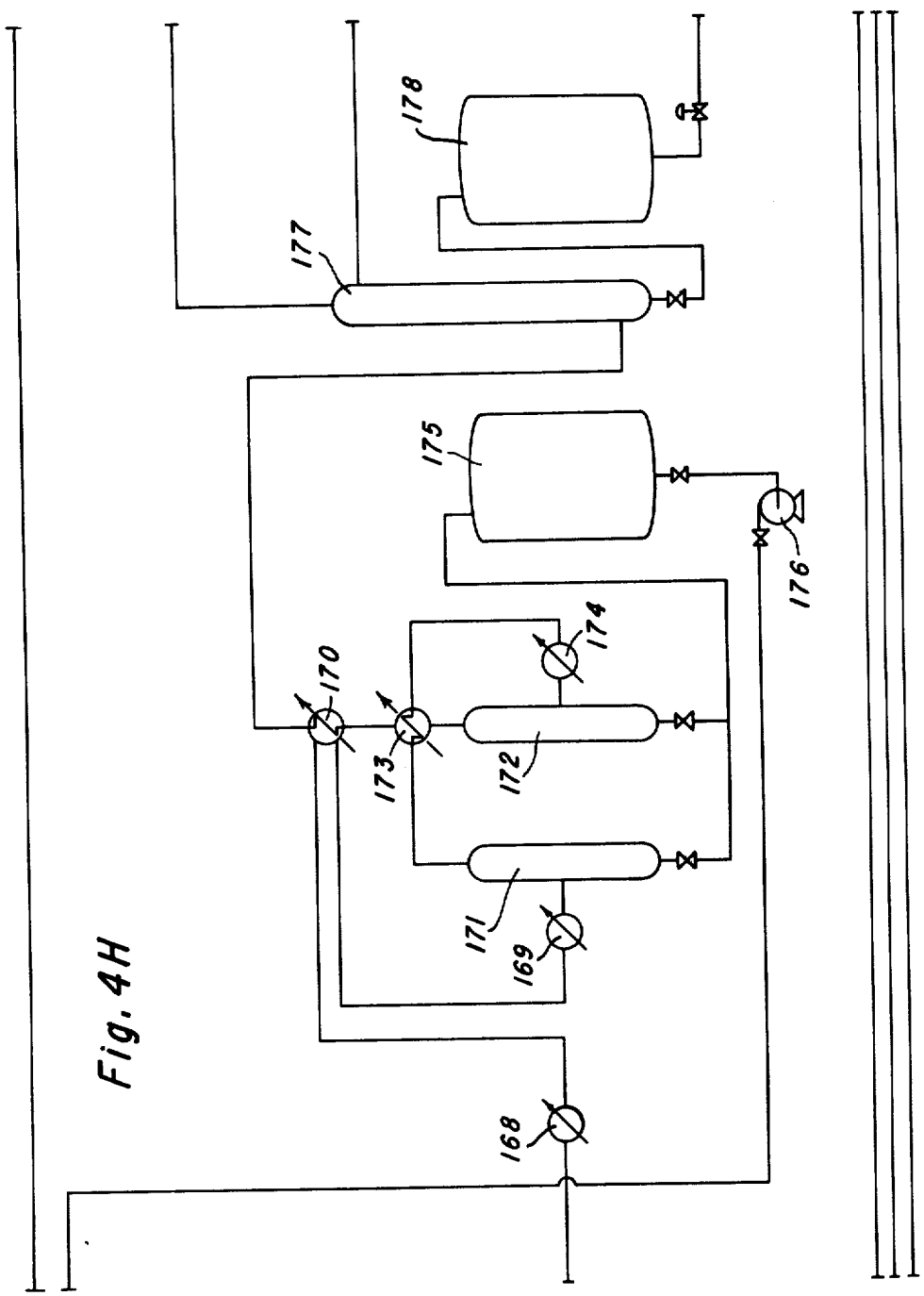
Figure 4I:
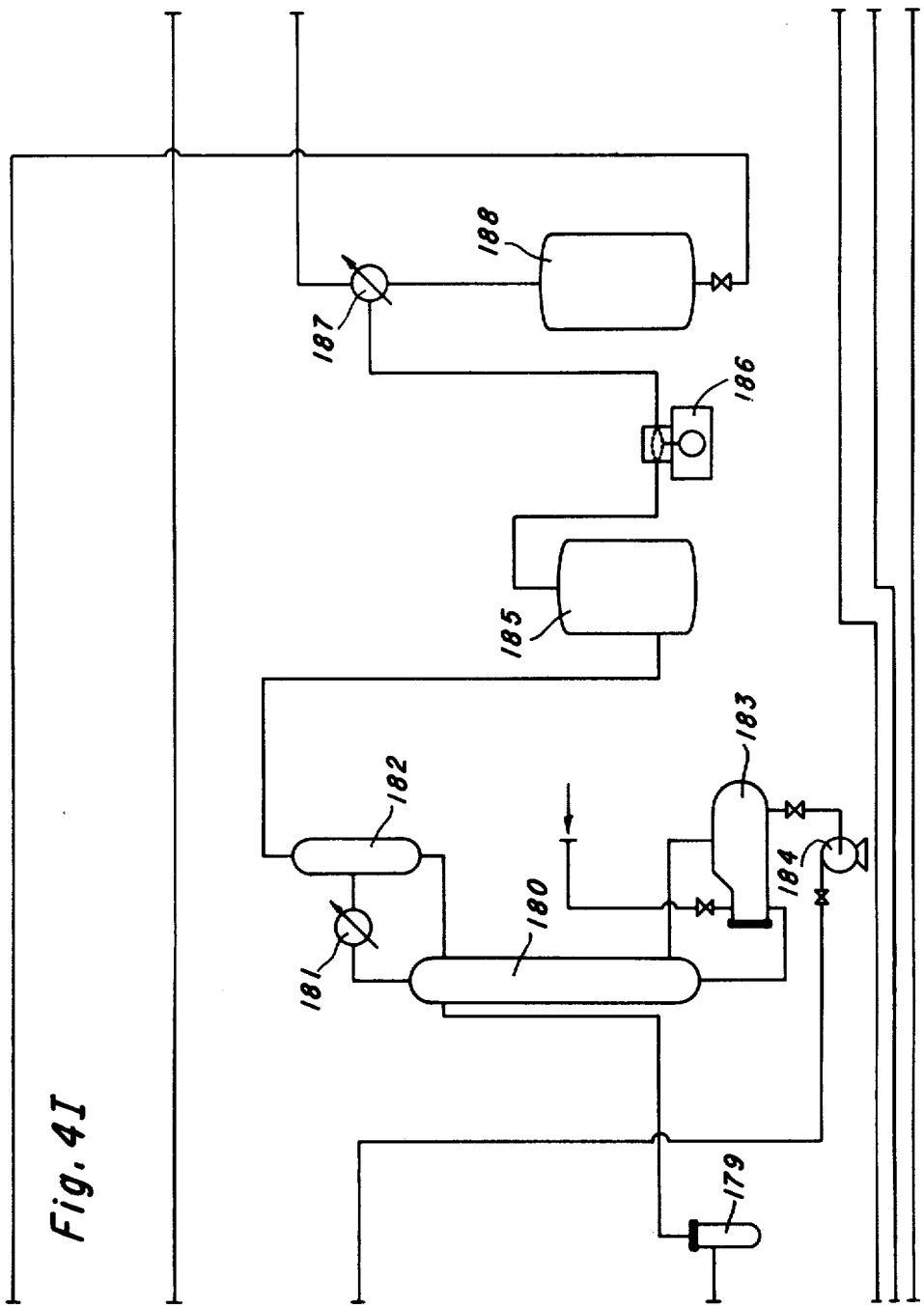
Figure 4J:
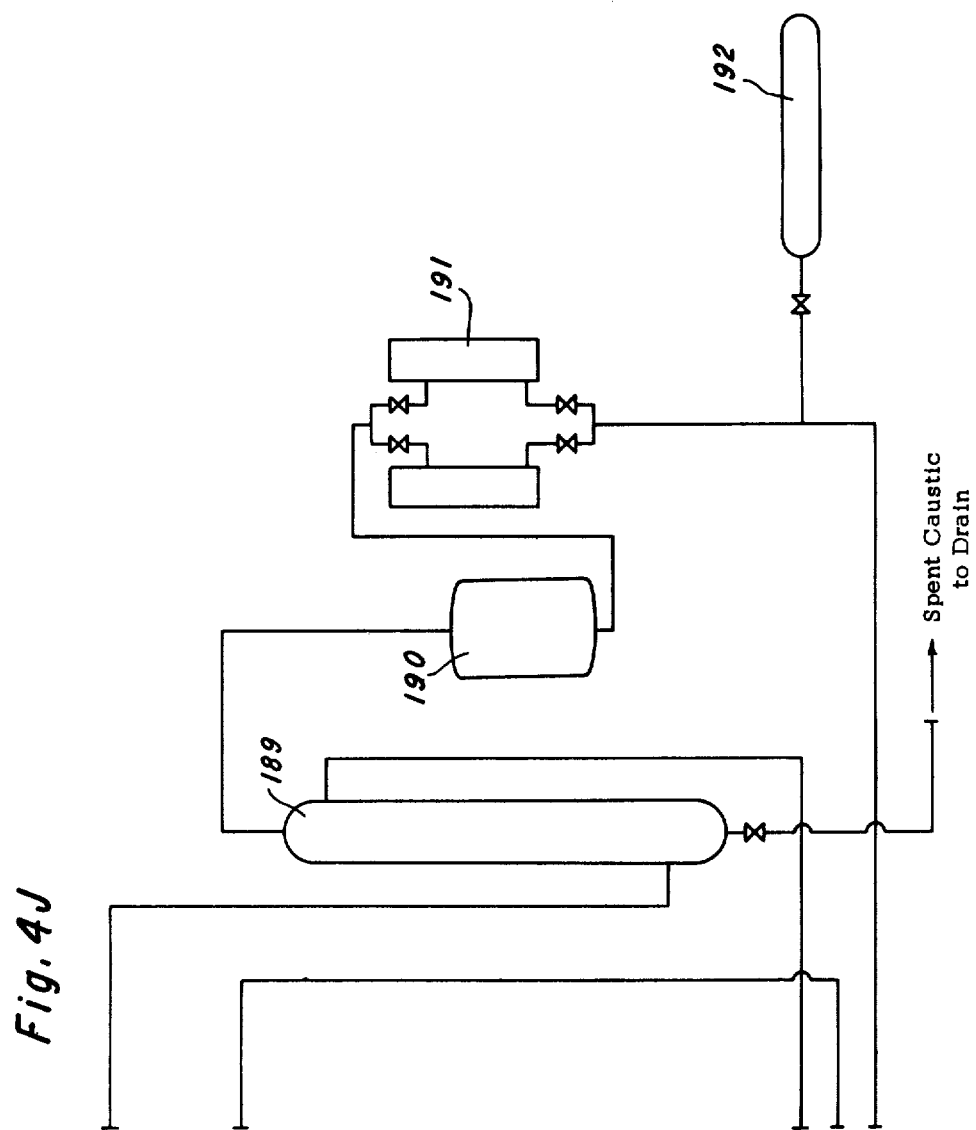

Referring now to FIG. 4A, a hydrogen chloride storage tank 101 is utilized for storage of anhydrous hydrogen chloride in liquid form for make-up of any system losses. The liquid anhydrous hydrogen chloride including that which is produced by silicon deposition reactor 155, is converted to a vapor by anhydrous hydrogen chloride vaporizer 102. An anhydrous hydrogen chloride liquid knockout drum 103 removes liquid carried over from the hydrogen chloride vaporizer. A dichlorosilane fraction vaporizer 104 vaporizes the dichlorosilane fraction product from overhead of the trichlorosilane distillation column 126 while a dichlorosilane fraction liquid knockout drum 105 removes any liquid carried over from the dichlorosilane fraction vaporizer 104. The metallurgical or industrial grade silicon containing about 1% impurity is fed to the chlorosilane reactor 106 by means of feed hopper 107. The metallurgical grade silicon is fed to the chlorosilane reactor 106 in particulate form. Chlorosilane reactor 106 reacts the metallurgical grade silicon with the gaseous anhydrous hydrogen chloride to form silicon tetrachloride and trichlorosilane. It also reacts recycled dichlorosilane with the anhydrous hydrogen chloride to convert such dichlorosilane to trichlorosilane and silicon tetrachloride. To accommodate the reaction, the reaction zone is maintained at a temperature between about 500°-750° F. at about 8-10 psig. The chlorosilane reactor includes an effluent solids removal filter 108 which removes entrained particulate silicon from the tetrachloride and trichlorosilane output stream of chlorosilane reactor 106. Chlorosilane stream condenser 109 condenses the silicon halides (silicon tetrachloride and chlorosilanes) from the chlorosilane reactor 106 product stream. The chlorosilane stream condensate storage tank 110 stores the halides condensed by the chlorosilane stream condenser 109. A chlorosilane stream condensate pump 111 transfers the condensed halides from condensate storage tank 110 through a chlorosilane stream condensate filter 112 and to a chlorosilane stream adsorber 113. The chlorosilane stream condensate filter 112 removes suspended solids from the liquid halide stream while the chlorosilane stream adsorber 113 removes impurities from the liquid halide stream. A second chlorosilane stream adsorber 114 further removes impurities from the liquid halide stream. Suspended solids from the liquid halide stream are then removed by chlorosilane stream filter 115 and raw chlorosilane storage tank 116 provides storage for the liquid halides. A raw chlorosilane pump 117 transfers liquid halides from raw chlorosilane storage tank 116 to raw chlorosilane adsorber 118. The raw chlorosilane adsorber 118 removes further impurities from the liquid halide stream and a raw chlorosilane filter 119 removes further suspended solids from the liquid halide stream. Halide splitter feed storage tank 120 provides halide storage for feed to distillation splitter columns 122. A halide splitter feed pump 121 delivers the halide feed from the halide splitter feed storage tank 120 to the silicon tetrachloride splitter column 122. The silicon tetrachloride splitter column 122 accomplishes rough separation of silicon tetrachloride from trichlorosilane. Trichlorosilane split condenser 123 condenses the trichlorosilane fraction from the overhead of splitter column 122 and silicon tetrachloride splitter reboiler 124 provides the heat required by the splitter column and also delivers the bottom product from the splitter column 122 to distillation column 126. An impure silicon tetrachloride transfer pump 125 transfers the impure silicon tetrachloride from the silicon tetrachloride splitter reboiler 124 to a storage tank for feed to the silicon tetrachloride distillation column 126. The trichlorosilane distillation column 126 separates the dichlorosilane fraction and light impurities from the trichlorosilane stream. The separated dichlorosilane fraction passes to dichlorosilane fraction condenser 127 which condenses the overhead product of the trichlorsilane distillation column 126. Heat required for operation of column 126 is provided by trichlorosilane column reboiler 128 which also delivers the bottom product from the column 126 by a trichlorosilane transfer pump 129 to a pure trichlorosilane storage tank. A silicon tetrachloride stream adsorber 130 removes impurities from the silicon tetrachloride stream. An impure silicon tetrachloride storage tank 131 stores impure silicon tetrachloride for feed to distillation column 135. The silicon tetrachloride is transferred from the impure silicon tetrachloride storage tank 131 by silicon tetrachloride distillation column feed pump 132, through an impure silicon tetrachloride adsorber 133 and impure silicon tetrachloride stream filter 134 to the silicon tetrachloride distillation column 135. The impure silicon tetrachloride adsorber 133 removes impurities from the impure silicon tetrachloride stream while the impure silicon tetrachloride stream filter 134 removes suspended solids from the impure silicon tetrachloride stream. The silicon tetrachloride distillation column 135 removes light impurities from the silicon tetrachloride stream. A trichlorosilane fraction condenser 136 condenses the overhead product stream of silicon tetrachloride from the distillation column 135. A silicon tetrachloride reboiler 137 provides the heat required for operation of the distillation column 135 and delivers the bottom product from distillation column 135 to silicon tetrachloride distillation column 139. The silicon tetrachloride distillation column feed pump 138 transfers this bottom product of the first silicon tetrachloride distillation column 135 as the feed to the second silicon tetrachloride distillation column 139. The silicon tetrachloride distillation column 139 removes heavy impurities from a silicon tetrachloride stream and the pure silicon tetrachloride overhead product of the silicon tetrachloride distillation column 139 is condensed to provide pure silicon tetrachloride by condenser 140. A silicon tetrachloride reboiler 141 provides the heat required for operation of the second distillation column 139 and delivers the bottom product from column 139 to a storage tank 143. Silicon tetrachloride still bottom transfer pump 142 transfers the bottoms of the distillation column 139 to the impure storage tank 143 which provides storage for the silicon tetrachloride still bottoms transferred from distillation column 139. These still bottoms may be further recycled but eventually will contain such a high impurity concentration which will require that they be sold for industrial purposes other than silicon production of otherwise disposed of. The still bottoms are removed from the storage tank 143 by transfer pump 144. Pure silicon tetrachloride storage tank 145 is utilized for storage of purified electronic grade silicon tetrachloride for feed to silicon tetrachloride boiler 150. The pure silicon tetrachloride from storage tank 145 is transferred by feed pump 146 to silicon tetrachloride boiler 150. A pure trichlorosilane storage tank 147 is utilized for storage of purified electronic grade trichlorosilane for feed to boiler 149. The pure trichlorosilane is delivered to boiler 149 by trichlorosilane boiler feed pump 148. Trichlorosilane boiler 149 is maintained at a temperature of about 160° F. at about 30 psig to vaporize the pure trichlorosilane while silicon tetrachloride boiler 150 is maintained at a temperature of about 210° F. at about 30 psig to vaporize the pure silicon tetrachloride. A boiler liquid blowdown storage tank 151 is utilized for storage of a continuous liquid draw from the process boilers 149 and 150. An impure liquid halide transfer pump 152 transfers liquid halides from boiler liquid blowdown storage tank 151 to raw chlorosilane storage tank 116 for reprocessing. The halide feed to the polysilicon deposition reactor is preheated by means of a halide feed preheater 153. The halide feed preheater 153 superheats the halide vapor feed stream prior to introduction into the reactor 155. A silicon seed feeder 154 feeds pure silicon seeds into the fluidized bed type deposition reactor 155. Pure polycrystalline silicon is deposited onto the seed crystals by the polysilicon fluidized bed deposition reactor 155 from the hydrogen reduction of the silicon chloride and chlorosilanes. This is accomplished by maintaning the reaction zone of reactor 155 at a temperature between about 850°–1350° C. at between about 5–25 psig. When sufficient silicon has deposited on the seed particles they will drop through the bottom of the reactor to provide the pure electronic grade polysilicon product which may then be grown into poly or monocrystalline rods. A reactor effluent cyclone separator 156 and a silicon fines electrostatic precipitator 157 remove silicon fines entrained in the effluent gas from the reactor which fines are then stored in storage drum 158. A reducing gas feed preheater 159 preheats the hydrogen feed stream prior to introduction into the reactor 155. Low pressure caustic scrubber 160 provides for emergency disposal of reactor effluent gas in the event of a malfunction downstream. Storage tank 161 provides for storage of a 5% caustic solution for the scrubbers and storage tank 162 provides for bulk storage of caustic as a 50% solution. The 5% caustic solution is delivered from storage tank 161 to a low pressure scrubber by means of transfer pump 163 and a high pressure scrubber by means of transfer pump 164. The 50% caustic solution is transferred from the caustic bulk storage tank 162 to the 5% caustic storage tank 161 by means of transfer pump 165. A reactor effluent compressor suction drum 166 provides suction plenum for reactor effluent compressor 167. The reactant effluent compressor 167 raises the pressure of the reactor effluent gas stream which is then passed to halide recovery condenser 168. The condenser 168 condenses the halides from the reactor effluent gas stream for reuse. Second and third halide recovery condensers 169 and 170 also condense halides from the reactor effluent gas stream for reuse. Halide knockout drums 171 and 172 remove the condensed halides from the recovery condensers 169 and 170 and halide recovery condensers 173 and 174 further condense the halides from the reactor effluent gas for reuse. The recovered halides from knockout drums 171 and 172 are stored in storage tank 175 and transferred by means of transfer pump 176 to the raw chlorosilane storage tank 116 for reuse. A hydrogen chloride absorber 177 removes hydrogen chloride from the recycled gas stream by absorption in water. The hydrochloric acid solution from the hydrogen chloride absorber 177 is stored in storage tank 178. The hydrochloric acid passes from storage tank 178 through a hydrochloric acid filter 179 for removal of suspended solids from the absorber effluent stream and hydrogen chloride stripper column 180 removes hydrogen chloride from the water solution. A hydrogen chloride overhead condenser 181 condenses the remaining water in the stripper overhead product stream which then passes through the hydrogen chloride overhead knockout drum 182 which removes condensate from the stripper overhead product stream. A hydrogen chloride stripper reboiler 183 provides heat for operation of the hydrogen chloride stripper column 180 and delivers the stripper column bottoms product stream by means of hydrogen chloride stripper bottoms transfer pump 184 to hydrogen chloride absorber as liquid feed. A first hydrogen chloride compressor suction drum 185 provides suction plenum for hydrogen chloride compressor 186. The hydrogen chloride compressor 186 increases stream pressure of recovered hydrogen chloride which is then condensed in hydrogen chloride condenser 187. An anhydrous liquid hydrogen chloride storage tank 188 is provided for storage of the recovered hydrogen chloride. The hydrogen chloride from the storage tank 188 passes through a high pressure caustic scrubber 189 which removes residual hydrogen chloride from the recycle hydrogen stream. A hydrogen stream deoxo 190 provides for the catalytic reduction of oxygen to water thereby removing oxygen from the hydrogen recycle stream. The hydrogen stream then passes from the hydrogen stream deoxo 190 through hydrogen stream driers 191 for removal of moisture from the hydrogen recycle stream and then to make-up hydrogen storage tank 192. Additional hydrogen may be added to the storage tank 192 for make-up of system losses.

It should be noted that in the above detailed system description of FIGS. 4A–J, various storage tanks are utilized for the temporary storage of liquids and gases. These storage tanks are not utilized for storage of such materials in the same sense that storage tanks are utilized in batch processing. The operation of the silicon refinery described above is continuous in that materials are continuously added to and removed from the storage tanks. The main purpose of the storage tanks in this embodiment is for safety so that the storage tanks may be filled up in case a downstream portion of the system malfunctions rather than for actual storage purposes.

As previously discussed with respect to FIGS. 1 and 2, the system is balanced for continuous operation by the fluidized bed halide reactor and the fluidized bed silicon deposition reactor. The remaining apparatus of the system are balanced in accordance with the input and output of these reactors to provide the balanced system. In order to make the description complete, the material flow in the system is next described in detail. For purposes of the material flow, consider the system is in continuous operation with continuous flow of material into and out of storage tanks. FIG. 5 is a block diagram of the system with each of the flow lines identified by an encircled number. These numered flow lines correspond to the encircled numbers of Table I which shows the approximate material balance in the system through each of such flow lines for one embodiment of the silicon refinery of the invention which produces about 250 kkg of purified silicon per year.

It should be noted, however, that this material balance is for the purpose of illustration and that anyone skilled in the art can readily adapt the illustrated material balance to suit any other desired production rate and plant size.

TABLE I

| Stream Number | | (1) | (2) | (3) | (4) | (5) | (6) | (7) | (8) | (9) |
|---|---|---|---|---|---|---|---|---|---|---|
| Stream Identification Components | M. Wt. | MGS lbs/hr | Make-up HCl lbs/hr | HCl Feed lbs/hr | Crude TCS Unit Product lbs/hr | TCS Unit Unreacted Losses lbs/hr | TCS Unit Off-Gas lbs/hr | Recycle Halides lbs/hr | TET Bottoms Recycle lbs/hr | TET OH lbs/hr |
| Hydrogen | 2.016 | | | | | | 6.47 | .16 | | |
| Silicon | 28.06 | 86.05 | | | | 8.61 | | | | |

TABLE I-continued
MATERIAL BALANCE

| Components | | | | | | | | | |
|---|---|---|---|---|---|---|---|---|---|
| Hydrogen Chloride | 36.461 | | 50.03 | 338.96 | | | 20.34 | 46.00 | |
| Dichlorosilane | 100.982 | | | | | | | 31.58 | |
| Trichlorosilane | 135.4 | | | | 480.78 | | 12.15 | 795.52 | 10.36 |
| Silicon Tetrachloride | 169.87 | | | | 28.88 | | 1.70 | 1217.89 | 135.40 | 163.87 |
| Total | | 86.05 | 50.03 | 338.96 | 509.66 | 8.61 | 40.66 | 2091.15 | 135.40 | 174.23 |

| Stream Number | | ⑩ | ⑪ | ⑫ | ⑬ | ⑭ | ⑮ | ⑯ | ⑰ | ⑱ |
|---|---|---|---|---|---|---|---|---|---|---|
| Stream Identification Components | M. Wt. | VAP. B. D. lbs/hr | FEED TO FRACT. lbs/hr | COLUMN VENTS lbs/hr | TCS OH lbs/hr | SURPLUS TET lbs/hr | VAP. FEED lbs/hr | FEED TO REACTORS lbs/hr | Si PRODUCT lbs/hr | REACTOR EFFLUENT lbs/hr |
| Hydrogen | 2.016 | | .16 | .16 | | | | 291.70 | | 286.70 |
| Silicon | 28.06 | | | | | | | | 69.60 | |
| Hydrogen Chloride | 36.461 | | 46.18 | 46.00 | .18 | | | | | 283.80 |
| Dichlorosilane | 100.982 | | 39.47 | 31.58 | 7.89 | | | | | 32.90 |
| Trichlorosilane | 135.4 | 62.24 | 1374.17 | 93.68 | 25.27 | | 1244.74 | 1182.50 | | 801.20 |
| Silicon Tetrachloride | 169.87 | 64.12 | 1610.16 | | | 28.47 | 1282.42 | 1218.30 | | 1218.30 |
| Total | | 126.36 | 3070.14 | 171.42 | 33.34 | 28.47 | 2527.16 | 2400.80 | 69.60 | 2622.90 |

| Stream Number | | ⑲ | ⑳ | ㉑ | ㉒ | ㉓ | ㉔ | ㉕ | ㉖ | ㉗ |
|---|---|---|---|---|---|---|---|---|---|---|
| Stream Identification Components | M. Wt. | RECYCLE GAS TO HCl SYS. lbs/hr | RE-CYCLE lbs/hr | LOSSES lbs/hr | MAKE-UP H₂ lbs/hr | VENT GASES TO HCl SYS. lbs/hr | VENT RECOVERY LIQUID lbs/hr | H₂ DRYER LOSSES lbs/hr | LOSSES lbs/hr | RE-CYCLE HCl lbs/hr |
| Hydrogen | 2.016 | 286.54 | 281.48 | 6.63 | 10.22 | 6.63 | | 3.63 | 1.43 | |
| Silicon | 28.06 | | | | | | | | | |
| Hydrogen Chloride | 36.461 | 237.80 | | 3.31 | | 66.34 | | | 11.90 | 288.93 |
| Dichlorosilane | 100.982 | 1.32 | | 3.02 | | 3.02 | 28.56 | | 1.32 | |
| Trichlorosilane | 135.4 | 5.68 | | 1.59 | | 1.59 | 104.24 | | 5.68 | |
| Silicon Tetrachloride | 169.87 | .41 | | .01 | | .01 | 1.69 | | .41 | |
| Total | | 531.75 | 281.48 | 14.56 | 10.22 | 77.59 | 134.49 | 3.63 | 20.74 | 288.93 |

Referring now to FIGS. 6–16, the apparatus comprising one embodiment of the silicon refinery of the invention will henceforth be described in detail. The same or similar piece of apparatus is utilized a number of times in the system of, for example, the embodiment of FIG. 4. Table II summarizes each of the apparatus of FIGS. 6–16 of their relationship by reference numeral to the systems diagram of FIG. 4.

TABLE II

| Figure | Apparatus | Reference Numerals from FIG. 4 (4A-J) |
|---|---|---|
| 6 | Packed Bed Column | 122, 126, 135, 139, 160, 177, 180, 189 |
| 7 | Shell and Tube Heat Exchanger | 168, 169, 173, 174 |
| 8 | Process Fluid Condenser, Horiz. | 109 |
| 9 | Process Vluid Condenser, Vert. | 123, 127, 136, 140, 181, 187 |
| 10 | Kettle Reboiler | 124, 128, 137, 141, 183 |
| 11 | Deoxo and Dryer System | 190, 191 |
| 12 | Chlorosilane Reactor | 106 |
| 13 | Deposition Reactor | 155 |
| 14 | Process Fluid Boiler | 149, 150, 102, 104 |
| 15 | Packed Bed Adsorber | 113, 114, 118, 130, 133 |
| 16 | Knockout Drum | 103, 105, 171, 172, 182 |

Referring then to FIG. 6, a packed bed column, well known in the art, is utilized as a distillation column to separate a liquid mixture into two components or as an absorber. The vessel 25 is comprised of metal which is non-reactive with the reactants and contains a packed bed 26 of glass or plastic saddles which have a large surface area per unit volume. In the case of a distillation column, a liquid mixture enters the vessel through liquid inlet 27. The distillation column is maintained at a suitable temperature and pressure so that the mixture is separated into two components with the component having the lower boiling point removed as a vapor through gas outlet 30 and the remaining component removed as a liquid through liquid outlet 29. In the case of an absorber, a vapor mixture enters the vessel through gas inlet 28. One component of the gas mixture is absorbed by a liquid entering inlet 28 and the remaining gas components pass through vapor outlet 30.

The shell and tube heat exchanger illustrated in FIG. 7 is utilized to exchange heat between two fluids. A first fluid passes through the tube side inlet 31 to the tube side outlet 32 while the second fluid passes through the shell side inlet 33 to the shell side outlet 34. Such vessels are well known in the art and are generally comprised of a metal which is non-reactive with the fluids passing through the vessel. The large surface area of the tubes within the shell allows efficient exchange of heat between the two fluids.

The process fluid condenser of FIG. 8 is also well known in the art and is similar in operation to the shell and tube heat exchanger. A coolant is run through the tubes connecting coolant inlet 39 to coolant outlet 40. The tubes have a large surface area within the vessel 38. A vapor which flows into vapor inlet 41, is cooled and condensed by the coolant flowing through the tubes and removed as a liquid from condensate outlet 42. Baffle 43 ensures efficient utilization of the surface area provided by the tubes. Another type of condenser is illustrated in FIG. 9. This condenser is similar to the condenser of FIG. 8; however, it is operated in a vertical position with the coolant run through the shell 44 from coolant inlet 45 to coolant outlet 46 and the vapor is run through the tubes 47 from vapor inlet 48 to condensate outlet 49. Baffles 50 provide efficient coolant contact with tube surfaces.

A kettle reboiler, well known in the art, is illustrated in FIG. 10. The kettle reboiler shell 51 is comprised of a metal which is non-reactive with the particular reactants involved. A heating fluid passes from heating fluid inlet 52 through tubes 53 and out of heating fluid outlet 54. The liquid to be boiled enters the vessel 51 through liquid inlet 55, is boiled by the heat provided by the heating fluid passing through tubes 53, and is removed as a vapor through vapor outlet 56. Where the liquid contains heavy impurities, the impurities will remain preferentially in the liquid phase and are removed along with some of the liquid through liquid outlet 57.

A deoxo and dryer unit which is utilized for the catalytic reduction of oxygen to water to remove oxygen from hydrogen in the recycle stream is illustrated in FIG. 11. The deoxo unit includes a metal vessel 58 containing a catalyst bed such as platinum-coated pellets 59. The dryer vessels 60 and 61 are comprised of metal and are filled with a molecular sieve material such as silica gel 62. Both the deoxo unit and dryers are well known in the art. The deoxo unit includes a wet gas inlet 63. The wet gas is catalytically reduced by the platinum catalyst pellets 59 in the vessel 58 and the wet hydrogen gas is fed to the dryers 60 and 61 by means of tube 67. The dryers 60 and 61 are utilized alternately and the dry hydrogen gas is fed out of dry gas outlet 66. Hydrogen inlet 65 is provided for adding make-up hydrogen to the system and an inert gas inlet 64 is also provided for running an inert gas such as argon through the deoxo unit and dryers.

The chlorosilane reactor of FIG. 12 and the silicon deposition reactor of FIG. 13 are both of the fluidized bed type. The chlorosilane reactor is comprised of a metal reactor chamber 68 which is filled with a bed 76 of industrial grade silicon in particulate form. The industrial grade silicon enters the reactor chamber through solids inlet 69. The reactant gas HCl enters the chamber through the reactant gas inlet 71 and reacts with the industrial grade silicon particles of the bed 76 to form the silicon halides and/or halosilanes, particularly TET and TSC and the by-product hydrogen which are removed from the reactant chamber through outlet 70. Heat generated in the reaction is removed by a coolant flowing from coolant inlet 73, through tubes 74 and out of coolant outlet 75. Solids dump outlets 72 are provided for removal of solid impurities remaining in the bottom of the reactor chamber.

The fluidized bed reactor of FIG. 13 provides for the reverse reaction of reducing TET and TSC to form pure silicon. The fluidized bed reactor vessel includes a support metal outer shell 78 comprised, for example, of a steel alloy which is lined in the lower reaction portion with a graphite liner 79 coated on the surface 80 with silicon carbide. The liner is constructed of graphite bricks which are sealed together with silicon carbide which is produced by an initial silicon deposition reaction. A layer of fire bricks may be provided between the outer shell 78 and the liner 79. A blanket of hydrogen may also be provided by charging hydrogen through hydrogen blanket inlet 84 which provides such blanket between the outer shell 78 and the graphite liner 79 to protect the outer shell 78 from the reactants and reaction environment. The hydrogen of the hydrogen blanket becomes part of the effluent gases. Gaseous reactants, particularly the TET, TCS and hydrogen, enter the reactor chamber through reaction gas inlet 82. Pure silicon seed particles are introduced into the reactor chamber through seed introduction inlet 81 to provide an elevated bed 85 of silicon particles. The hydrogen reacts in a reduction reaction with the TET and TCS to produce silicon which is deposited on the seed particles of the bed 85. When the seed particles have grown to sufficient size, they will migrate to the bottom of the reactor chamber and are removed therefrom through the reaction gas inlet which also acts as a particulate removal outlet 82. A low pressure inert gas may be utilized to aid in the continuous removal of the silicon particles. The effluent gas comprised of unreacted TET, TCS and hydrogen and the by-product HCl are removed from the reactor through effluent gas outlet 83. In operation, the fluidized bed reactor is maintained at a temperature between approximately 850°–1350° C. (the reduction temperature of the TET/TCS) by preferably a gas heater. The reactor may also be heated by resistance heater coils surrounding the liner 79, filament within the reactor chamber, an induction coil surrounding the graphite liner, or any combination of these means.

The process fluid boiler illustrated in FIG. 14 is comprised of a metal vessel 86 having a liquid feed inlet 87. The vapor produced in the boiling process is removed from the vessel 86 through vapor outlet 89. Vapor passes through a vapor phase separator 90 to prevent liquid from passing with the vapor stream. A liquid impurity containing residue may be purged from the vessel through liquid purge outlet 88. Heat is provided to the vessel by passing a heating fluid from heating fluid inlet 91 through heater tubes 92 which contact the liquid to be boiled and out of heating fluid outlet 93.

A packed bed adsorber is illustrated in FIG. 15. The packed bed adsorber is comprised of a metal vessel 94 containing an adsorbent 95 such as activated charcoal or silica gel. A gaseous mixture flows through the vessel from flow inlet 96 to flow outlet 97. The adsorbent 95 adsorbs selected components of the gaseous mixture dependent upon the adsorbent chosen. When sufficient adsorption has taken place the vessel is purged with a gas which removes the adsorbed components from the adsorber bed 95. In order to provide continuous flow through the system, the packed bed adsorber is generally provided in pairs such that one of such adsorbers is in operation while the other is being purged.

A knockout drum is illustrated in FIG. 16. The knockout drum is utilized to remove liquid from a wet gas feed. The knockout drum is comprised of a metal vessel 98 having a wet gas feed inlet 99 for introducing the wet gas into the vessel. The vapor component is removed from vapor outlet 100 and the liquid component is removed from liquid outlet 100A.

Although specific examples of the apparatus of the silicon refinery of the present invention have been illustrated, along with examples of specific fluid components and flow rates, it should be understood that these are only exemplitive of one particular embodiment of a silicon refinery in accordance with the present invention to produce approximately 250 kkg of silicon per year. it should be understood that other pieces of equipment may be substituted for those shown in performing similar functions as well as the illustrated apparatus being modified to produce different quantities of purified silicon. Furthermore, it should be understood that some of the apparatus in the detailed description of the preferred embodiment may be deleted from the system depending upon the degree of purification and control of feed gas concentrations desired.

Since it is obvious that many additional changes and modifications can be made in the above-described details without departing from the nature and spirit of the invention, it is understood that the invention is not to be limited to said details except as set forth in the appended claims.

What is claimed is:

1. A closed cycle silicon refinery system for producing purified electronic grade silicon from impure silicon comprising:
   (a) a first reactor having means therein for reacting a first stream comprised of hydrogen halide with said impure silicon to produce a second impurity containing effluent stream of halosilane and/or silicon halide and a third effluent stream comprised of hydrogen and unreacted hydrogen halide;
   (b) purification means for removing impurities from said second stream to produce a fourth effluent stream of purified halosilane and/or silicon halide, and means coupling said purification means with said first reactor for receiving said second stream;
   (c) a second reactor having means therein for reacting said fourth stream with a fifth stream comprised of hydrogen to produce said purified electronic grade silicon and a sixth effluent stream comprised of hydrogen halide and unreacted hydrogen, and means coupling said second reactor with said purification means to receive said fourth stream;
   (d) separation means for separating a mixture of hydrogen and hydrogen halide to produce said first stream of hydrogen halide and said fifth stream of hydrogen, and means coupling said separation means with said first reactor to receive said third stream and with said second reactor to receive said sixth stream;
   (e) means in fluid communicaton with said separation means and said first reactor for passing said first stream to said first reactor; and
   (f) means in fluid communication with said separation means and said second reactor for passing said fifth stream to said second reactor.

2. The refinery system according to claim 1 wherein said separation means includes a hydrogen halide absorber.

3. The refinery system according to claim 1 wherein said purification means includes a particle filter.

4. The refinery system according to claim 1 wherein said purification means includes at least one fractionation column.

5. The refinery system according to claim 1 wherein said purification means includes at least one fractionation column in fluid communication with a condenser for condensing the overhead product of the fractionation column and in fluid communication with a boiler for vaporizing the liquid bottom product of said fractionation column.

6. The refinery system according to claim 1 wherein said purification means includes at least two fractionation columns, a first fractionation column for removing light impurities being in fluid communication with a second fractionation column removing heavy impurities.

7. The refinery system according to claim 1 wherein said first reactor is a fluidized bed reactor.

8. The refinery system according to claim 7 wherein said first reactor contains a particulate bed of said impure silicon in said first reaction zone.

9. The refinery system according to claim 8 wherein said first reactor includes means for adding additional impure silicon particles to said particulate bed.

10. The refinery system according to claim 1 wherein said second reactor is a fluidized bed reactor.

11. The refinery system according to claim 10 wherein said second reactor contains a particulate bed of pure, finely divided silicon seed particles in said second reaction zone.

12. The refinery system according to claim 11 wherein said second reactor includes means for removing from said bed those silicon seed particles on which a predetermined amount of silicon has been deposited in said second reaction zone and means for adding new silicon seed particles to said bed.

13. A closed cycle silicon refinery system for producing a purified electronic grade silicon from impure silicon comprising:
   (a) a first reactor having means therein for reacting a first stream comprised of hydrogen halide with said impure silicon to produce a second impurity containing effluent stream of halosilane and/or silicon halide and a third effluent stream comprised of hydrogen and unreacted hydrogen halide;
   (b) purification means for removing impurities from said second stream to produce a fourth effluent stream of purified halosilane and/or silicon halide, and means coupling said purification means with said first reactor for receiving said second stream;
   (c) a second reactor having means therein for reacting said fourth stream with a fifth stream comprised of hydrogen to produce said purified electronic grade silicon and a sixth effluent stream comprised of hydrogen halide, unreacted hydrogen and unreacted halosilane and/or silicon halide, and means coupling said second reactor with said purification means to receive said fourth stream;
   (d) first separation means for separating halosilane and/or silicon halide from a mixture of halosilane and/or silicon halide and hydrogen and/or hydrogen halide to produce a seventh effluent stream of halosilane and/or silicon halide and an eighth effluent stream of hydrogen and/or hydrogen halide;
   (e) second separation means for separating a mixture of hydrogen and hydrogen halide to produce said first stream of hydrogen halide and said fifth stream of hydrogen, and means coupling said second separation means with said first reactor to receive said third stream and with said first separation means to receive said eighth stream; (f) means in fluid communication with said second separation means and said first reactor for passing said first stream to said first reactor; and
   (g) means in fluid communication with said second separation means and said second reactor for passing said fifth stream to said second reactor.

14. The refinery system according to claim 13 including means in fluid communication with said first separation means and said second reactor for passing said seventh stream back to said second reactor along with said fourth stream.

15. The refinery system according to claim 13 wherein said second separation means includes a hydrogen halide absorber.

16. The refinery system according to claim 13 wherein said first separation means includes a condenser for condensing said halosilane and/or silicon halide to produce said seventh effluent stream and pass hydrogen and/or hydrogen halide vapor to provide said eighth effluent stream.

17. The refinery system according to claim 13 wherein said purification means includes a particle filter.

18. The refinery system according to claim 13 wherein said purification means includes at least one fractionation column.

19. The refinery system according to claim 13 wherein said purification means includes at least one fractionation column in fluid communication with a condenser for condensing the overhead product of the fractionation column and in fluid communication with a boiler for vaporizing the liquid bottom product of said fractionation column.

20. The refinery system according to claim 13 wherein said purification means includes at least two fractionation columns, a first fractionation column for removing light impurities being in fluid communication with a second fractionation column removing heavy impurities.

21. The refinery system according to claim 13 wherein said first reactor is a fluidized bed reactor.

22. The refinery system according to claim 21 wherein said first reactor contains a particulate bed of said impure silicon in said first reaction zone.

23. The refinery system according to claim 22 wherein said first reactor includes means for adding additional impure silicon particles to said particulate bed.

24. The refinery system according to claim 13 wherein said second reactor is a fluidized bed reactor.

25. The refinery system according to claim 24 wherein said second reactor contains a particulate bed of pure, finely divided silicon seed particles in said second reaction zone.

26. The refinery system according to claim 25 wherein said second reactor includes means for removing silicon seed particles on which a predetermined quantity of silicon has been deposited in said second reaction zone and means for adding new silicon seed particles to said particulate bed.

27. A closed cycle silicon refinery system for producing purified electronic grade silicon from impure silicon comprising:
(a) a first reactor having means therein for reacting a first stream comprised of hydrogen halide with said impure silicon to produce a second impurity containing effluent stream of halosilane and/or silicon halide and a third effluent stream comprised of hydrogen and unreacted hydrogen halide;
(b) purification means for removing impurities from said second stream to produce fourth effluent stream of purified halosilane and/or silicon halide, and means coupling said purification means with said first reactor for receiving said second stream;
(c) first separation means for separating the halosilane from the silicon halide of said fourth stream to produce a fifth effluent stream of purified halosilane and a sixth effluent stream of purified silicon halide, and means coupling said first separation means with said purification means to receive said fourth stream;
(d) means in fluid communication with said first separation means for controllably mixing said fifth and sixth streams to produce a seventh stream containing a predetermined ratio of purified halosilane to pruified silicon halide;
(e) a second reactor having means therein for reacting said seventh stream and an eighth stream comprised of hydrogen to produce said purified electronic grade silicon and a ninth effluent stream comprised of hydrogen halide, unreacted hydrogen and unreacted halosilane and/or silicon halide, and means coupling said second reactor with said controllable mixing means to receive said seventh stream;
(f) second separation means for separating halosilane and/or silicon halide from a mixture of halosilane and/or silicon halide and hydrogen and/or hydrogen halide to produce a tenth effluent stream of halosilane and/or silicon halide and an eleventh effluent stream of hydrogen and/or hydrogen halide, and means coupling said second separation means with said second reactor for receiving said ninth stream;
(g) means in fluid communication with said second separation means and said first separation means for passing said tenth stream back to said first separation means along with said fourth stream;
(h) third separation means for separating a mixture of hydrogen and hydrogen halide to produce said first stream of hydrogen halide and said eighth stream of hydrogen, and means coupling said third separation means with said first reactor to receive said third stream and with said second separation means to receive said eleventh stream;
(i) means in fluid communication with said third separation means and said first reactor for passing said first stream to said first reactor; and
(j) means in fluid communication with said third separation means and said second reactor for passing said eighth stream to said second reactor.

28. The refinery system according to claim 27 including a second purification means providing said fluid communication between said first separation means and said controllable mixing means for separately further purifying said fifth and sixth streams as they pass to said controllable mixing means.

* * * * *